United States Patent
Wada

(10) Patent No.: US 10,764,488 B2
(45) Date of Patent: Sep. 1, 2020

(54) IMAGING DEVICE, IMAGING DEVICE MAIN BODY, AND FOCUSING CONTROL METHOD OF IMAGING DEVICE

(71) Applicant: FUJIFILM Corporation, Tokyo (JP)

(72) Inventor: Tetsu Wada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/824,173

(22) Filed: Mar. 19, 2020

(65) Prior Publication Data

US 2020/0221034 A1 Jul. 9, 2020

Related U.S. Application Data

(63) Continuation of application No. PCT/JP2018/032915, filed on Sep. 5, 2018.

(30) Foreign Application Priority Data

Sep. 20, 2017 (JP) ................................. 2017-180246

(51) Int. Cl.
*H04N 5/232* (2006.01)
*H04N 5/225* (2006.01)

(52) U.S. Cl.
CPC ....... *H04N 5/23212* (2013.01); *H04N 5/2254* (2013.01); *H04N 5/23293* (2013.01); *H04N 5/23299* (2018.08); *H04N 5/232122* (2018.08)

(58) Field of Classification Search
CPC ......... H04N 5/23212; H04N 5/232122; H04N 5/23299; H04N 5/2254; H04N 5/23293; H04N 5/23287
See application file for complete search history.

(56) References Cited

U.S. PATENT DOCUMENTS

| 6,689,998 B1 | 2/2004 | Bremer |
| 2006/0110150 A1 | 5/2006 | Kurosawa |

FOREIGN PATENT DOCUMENTS

| JP | 63-93277 A | 4/1998 |
| JP | 2006-145813 A | 6/2006 |
| JP | 2010-107866 A | 5/2010 |

(Continued)

OTHER PUBLICATIONS

Machine English Translation for JP63-93277A, Apr. 23, 1988 (Year: 1988).*

(Continued)

*Primary Examiner* — Nelson D. Hernández Hernández
(74) *Attorney, Agent, or Firm* — Birch, Stewart, Kolasch & Birch, LLP

(57) ABSTRACT

Provided are an imaging device, an imaging device main body, and a focusing control method of an imaging device capable of appropriately supporting a photographer at the time of focusing. An image sensor movement driver that moves an image sensor along an optical axis is provided, and a subject is tracked by moving the image sensor within a movable range. A focusing operation detector that detects a focusing operation for the subject and a movable range switch that switches the movable range of the image sensor are provided. In a case where the focusing operation is detected by the focusing operation detector, the movable range switch widens the movable range of the image sensor.

25 Claims, 22 Drawing Sheets

(56) References Cited

FOREIGN PATENT DOCUMENTS

| JP | 2014-48545 A | 3/2014 |
| JP | 2016-6940 A | 1/2016 |
| JP | 2016-148832 A | 8/2016 |

OTHER PUBLICATIONS

Machine English Translation for JP2010107866A, May 13, 2010 (Year: 2010).*
International Search Report for PCT/JP2018/032915 dated Dec. 4, 2018.
Written Opinion of the International Searching Authority for PCT/JP2018/032915 dated Dec. 4, 2018.

* cited by examiner

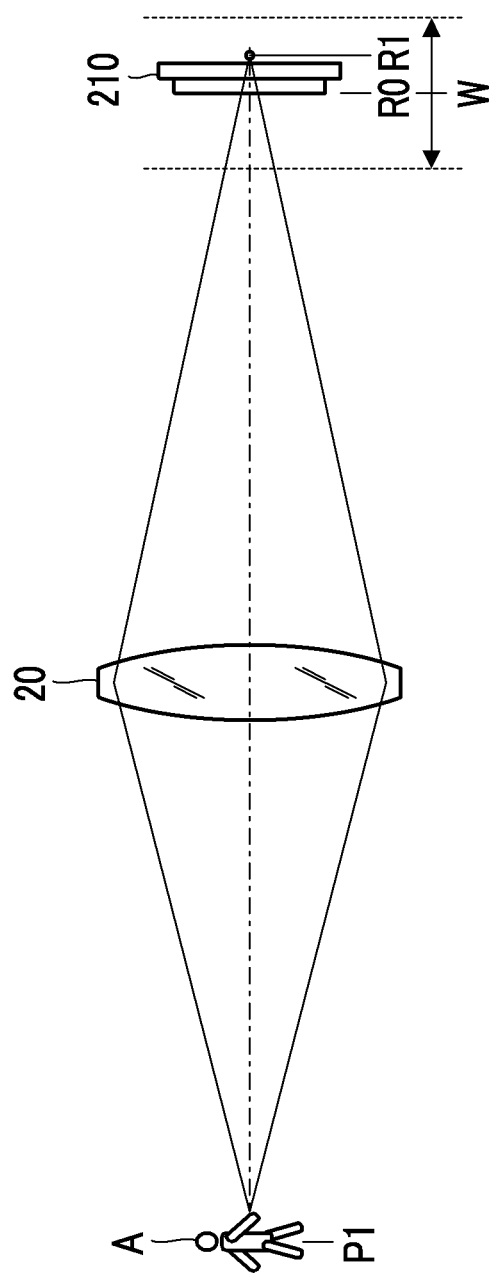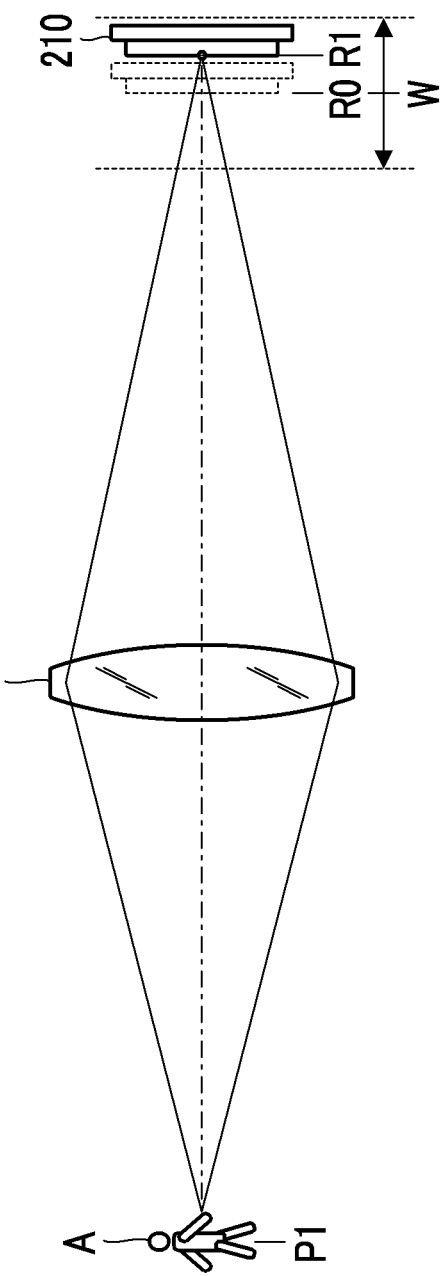

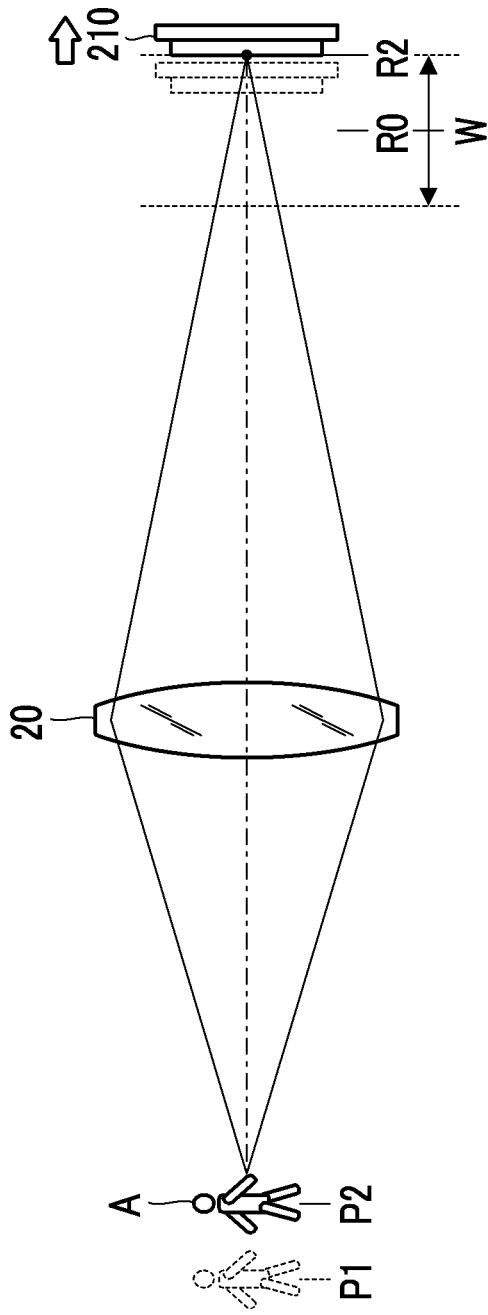
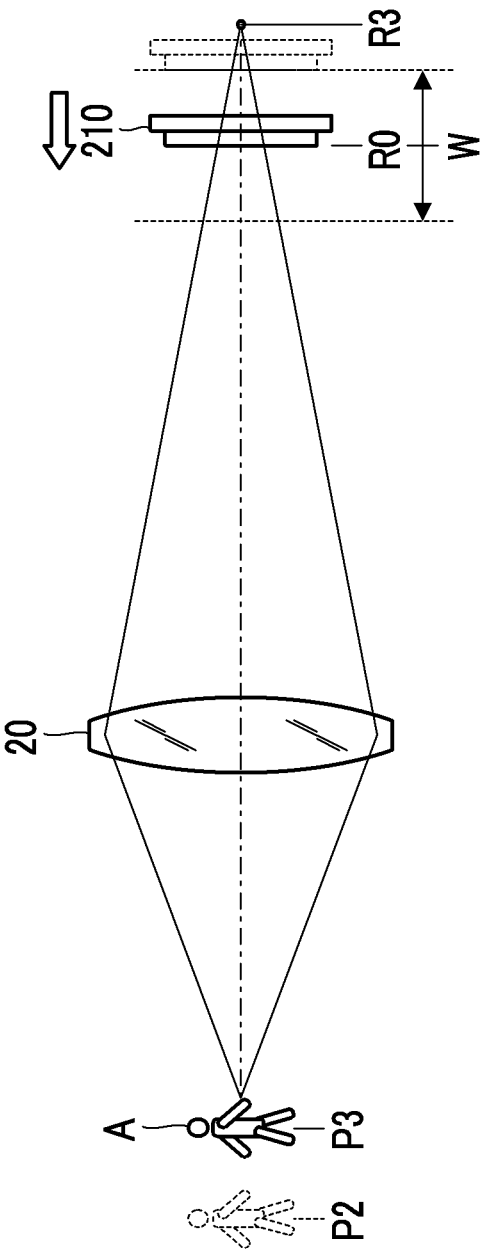

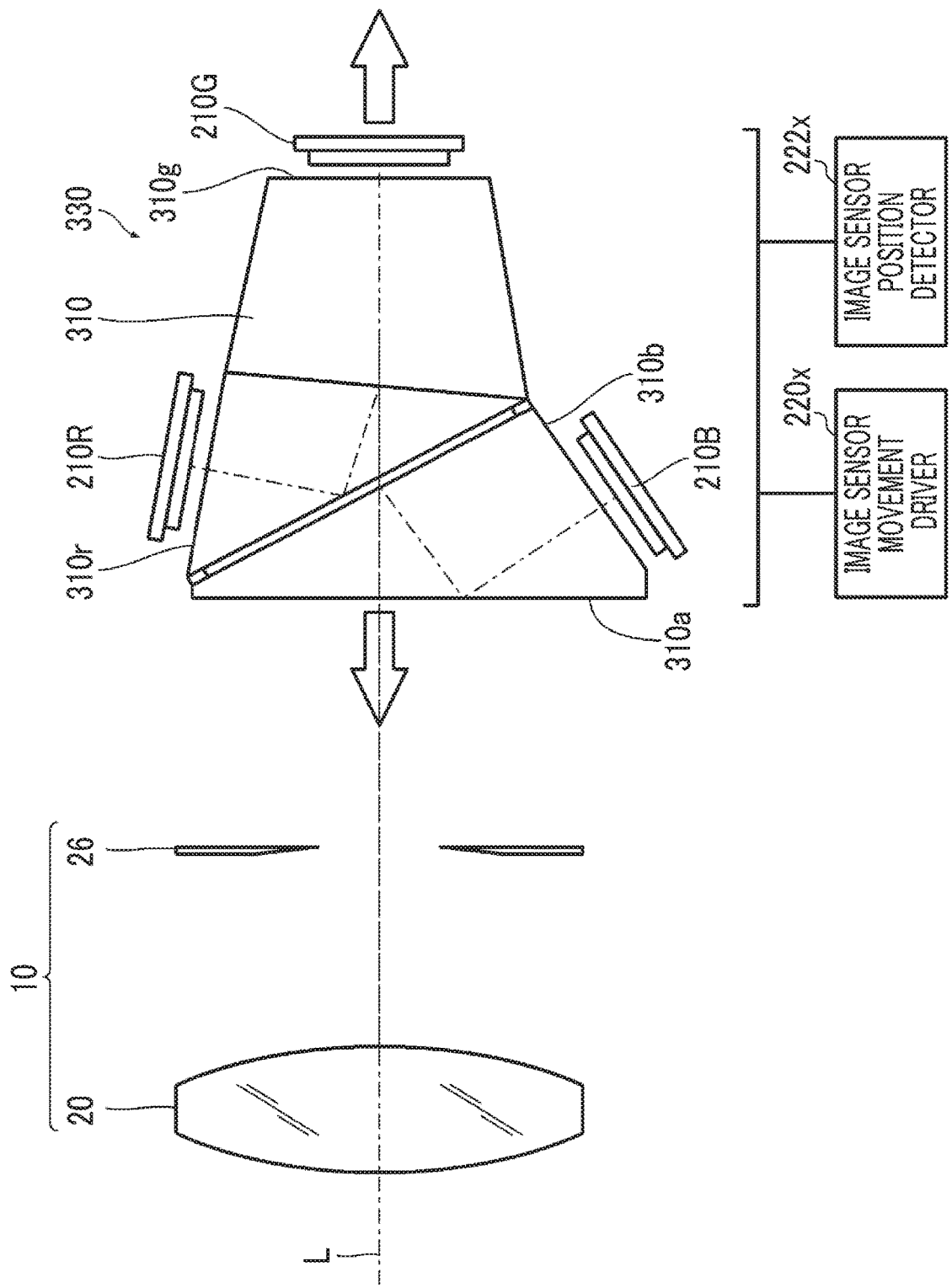

IMAGING DEVICE, IMAGING DEVICE MAIN BODY, AND FOCUSING CONTROL METHOD OF IMAGING DEVICE

CROSS-REFERENCE TO RELATED APPLICATIONS

The present application is a Continuation of PCT International Application No. PCT/JP2018/032915 filed on Sep. 5, 2018 claiming priority under 35 U.S.C. § 119(a) to Japanese Patent Application No. 2017-180246 filed on Sep. 20, 2017. Each of the above applications is hereby expressly incorporated by reference, in its entirety, into the present application.

BACKGROUND OF THE INVENTION

1. Field of the Invention

The present invention relates to an imaging device, an imaging device main body, and a focusing control method of an imaging device, and particularly to an imaging device, an imaging device main body, and a focusing control method of an imaging device which has a function of adjusting a focus by moving an image sensor.

2. Description of the Related Art

In an imaging device having no autofocus (AF) function, a focus is manually adjusted. Further, even an imaging device having an AF function may turn off the AF function and manually adjust the focus by the photographer.

JP2016-148832A suggests an imaging device having a function of performing contrast AF by moving an image sensor back and forth in a case where a photographer pushes an AF button after a focus is manually adjusted, as a function of supporting manual focus adjustment.

SUMMARY OF THE INVENTION

However, the imaging device of JP2016-148832A has a disadvantage that the focusing cannot be appropriately performed even though the AF is operated in a case where a subject moves.

In order to solve the problem, it is necessary to control the movement of the image sensor such that the AF is automatically operated in the vicinity of the focusing and the focusing state is maintained. However, in a case where the focus is manually adjusted, the photographer may not move the focus lens only for performing the focusing, and may move the focus lens to confirm a blurriness state. In a case where the AF is automatically operated in this case, there is a problem that control contrary to the intention of the photographer is performed.

The present invention has been made in view of such circumstances, and an object of the present invention is to provide an imaging device, an imaging device main body, and a focusing control method of an imaging device capable of appropriately supporting a photographer during focusing.

Means for solving the aforementioned problems are as follows.

(1) An imaging device comprises an imaging lens that has a focus adjustment function, an image sensor, an image sensor movement driver that moves the image sensor along an optical axis, a focus detector that detects a defocus amount, a tracking controller that controls the movement of the image sensor within a movable range to track a subject based on the defocus amount detected by the focus detector, a focusing operation detector that detects a focusing operation of the imaging lens for the subject based on a change of the defocus amount detected by the focus detector, and a movable range switch that widens the movable range of the image sensor in a case where the focusing operation is detected by the focusing operation detector.

According to the present aspect, the subject can be tracked by moving the image sensor. Here, the tracking means that the subject is continued to be focused, that is, the focusing state is maintained. The image sensor can track the subject within the movable range. Therefore, the movable range of the image sensor is a trackable range. The movable range of the image sensor is automatically switched depending on whether or not the focusing operation is performed. The switching is performed by the movable range switch. In a case where the focusing operation is detected, the movable range switch widens the movable range of the image sensor. The focusing operation is an operation for focusing on the subject by adjusting the focus of the imaging lens having the focus adjustment function. Thus, the focusing operation is detected based on the change of the defocus amount. The case where the focusing operation is performed is a case where the photographer tries to focus on the subject by adjusting the focus of the imaging lens. Therefore, in this case, the focusing operation performed by the photographer can be appropriately supported by widening the movable range of the image sensor and widening the trackable range. Meanwhile, even though the photographer operates the imaging lens, in a case where this operation is not an operation for focusing on the subject, the movable range is not changed and is maintained constant. In a case where the operation is not the focusing operation and the trackable range is widened by widening the movable range of the image sensor, the result does not match the intention of the photographer. That is, for example, in a case where the photographer operates the imaging lens in order to confirm the blurriness state and the subject is tracked in a wide range, the blurriness state which is the original target cannot be confirmed. Therefore, in a case where the operation is not the focusing operation, the operation matching the intention of the photographer can be performed by maintaining the movable range with no change.

Zero is included in the movable range of the image sensor before the movable range is widened. In this case, the subject is tracked only in a case where the movable range is widened.

The widened movable range can be optionally set within a range in which the image sensor movement driver can physically move the image sensor. As this range becomes wider, the trackable range can be widened.

(2) In the imaging device according to (1), in a case where the tracking of the subject cannot be performed after the movable range of the image sensor is widened, the movable range switch narrows the movable range of the image sensor to an original range.

According to the present aspect, after the movable range of the image sensor is widened, in a case where the tracking of the subject cannot be performed, the movable range of the image sensor is narrowed and returned to the original range. In a case where the image sensor moves to the end portion of the movable range, the subsequent tracking cannot be performed. In this case, the movable range of the image sensor is narrowed and returned to the original range. That is, the movable range is returned to the movable range before the movable range is widened.

(3) In the imaging device according to (1), in a case where a position of an image formation point of the subject is separated from the movable range of the image sensor by a predetermined distance or more after the movable range of the image sensor is widened, the movable range switch narrows the movable range of the image sensor to an original range.

According to the aspect, after the movable range of the image sensor is widened, in a case where the position of the image formation point of the subject is separated from the movable range of the image sensor by the predetermined distance or more, the movable range of the image sensor is narrowed and returned to the original range. The position of the image formation point of the subject is the position at which the image of the subject is formed. The tracking is performed by moving the image sensor so as to follow the movement of the image formation point. Therefore, in a case where the position of the image formation point exceeds the movable range of the image sensor, the tracking cannot be performed. In the present aspect, in a case where the position of the image formation point is separated from the movable range of the image sensor by the predetermined distance or more, the movable range of the image sensor is narrowed and returned to the original range.

(4) In the imaging device according to any one of (1) to (3), in a case where the focusing operation is detected by the focusing operation detector, the movable range switch widens the movable range of the image sensor to a predetermined range from zero.

According to the present aspect, in a case where the focusing operation is detected, the movable range of the image sensor is widened to the predetermined range from zero. That is, in a case where the focusing operation is detected, the movable range of the image sensor is set for the first time. Therefore, in this case, the image sensor can initially move in a case where the focusing operation is detected. Zero mentioned herein includes a range that can be regarded as almost zero.

(5) In the imaging device according to any one of (1) to (4), the focusing operation detector detects the focusing operation by detecting that a fluctuation rate of the defocus amount is equal to or less than a threshold value within a predetermined range before and after a position at which the subject is focused.

According to the present aspect, it is determined that the focusing operation is performed in a case where the fluctuation rate of the defocus amount is equal to or less than the threshold value within the predetermined range before and after the position at which the subject is focused. That is, it is recognized that the focusing operation is performed in a case where the speed of the focus adjustment is reduced at the position in the vicinity of the focusing. In general, in a case where the subject is focused, the photographer performs fine adjustment by reducing the speed in the vicinity of the focusing. The focusing operation can be appropriately detected by detecting that the speed of the focus adjustment is reduced at the position in the vicinity of the focusing.

(6) In the imaging device according to any one of (1) to (5), in a case where the subject is focused, the tracking controller starts the tracking of the subject.

According to the present aspect, in a case where the subject is focused, the tracking of the subject is automatically started. That is, the movement of the image sensor is controlled so as to maintain the focusing state.

(7) In the imaging device according to any one of (1) to (5), in a case where the defocus amount is continuously equal to or less than a threshold value for a predetermined time, the tracking controller starts the tracking of the subject.

According to the present aspect, the tracking of the subject is automatically started in a case where the defocus amount is continuously equal to or less than the threshold value for the predetermined time. That is, in a case where the state close to the focusing is maintained for the predetermined time, the tracking of the subject is automatically started.

(8) In the imaging device according to any one of (1) to (5), in a case where a fluctuation rate of the defocus amount is equal to or less than a threshold value within a predetermined range before and after a position at which the subject is focused, the tracking controller starts the tracking of the subject.

According to the present aspect, in a case where the fluctuation rate of the defocus amount is equal to or less than the threshold value within the predetermined range before and after the position at which the subject is focused, the tracking of the subject is automatically started. That is, the tracking is automatically started in a case where the speed of the focus adjustment is reduced at the position in vicinity of the focusing. Therefore, the tracking is automatically started in a case where the operation for focusing on the subject is performed.

(9) In the imaging device according to any one of (1) to (8), in a case where the image sensor reaches an end portion of the movable range and the tracking of the subject cannot be performed, the tracking controller returns the image sensor to a reference position.

According to the present aspect, in a case where the image sensor reaches the end portion of the movable range and the tracking of the subject cannot be performed, the image sensor is returned to the reference position. Accordingly, it is possible to improve followability at the time of resuming the tracking by returning the image sensor to the reference position.

(10) In the imaging device according to (9), the tracking controller returns the image sensor to the reference position by moving the image sensor at a moving speed corresponding to the change of the defocus amount.

According to the present aspect, at the time of returning the image sensor to the reference position, the image sensor is returned to the reference position by moving the image sensor at the moving speed corresponding to the change in the defocus amount. In a case where the image sensor is returned to the reference position, since the focus state is changed, there is a concern that an unnatural image is obtained. However, the image sensor can be returned to the reference position without giving a uncomfortable feeling to the image by moving the image sensor as in the present aspect.

(11) The imaging device according to any one of (1) to (10) further comprises a mode switch that switches between turned-on and turned-off of a tracking range widening mode. In a case where the tracking range widening mode is turned on and the movable range of the image sensor is widened once, the movable range switch stops a subsequent switching operation.

According to the present aspect, the mode switch for turning on and off the tracking range widening mode is further provided. In a case where the tracking range widening mode is turned on, the subsequent switching operation is stopped in a case where the movable range of the image sensor is widened. That is, in a case where the movable range of the image sensor is widened once, the widened state is continuously maintained. Accordingly, the intention of the photographer can be appropriately reflected on the control.

(12) The imaging device according to any one of (1) to (8) further comprises a mode switch that switches between turned-on and turned-off of a tracking range widening mode. In a case where the tracking range widening mode is turned on and the movable range of the image sensor is widened once, the movable range switch stops a subsequent switching operation, and in a case where the movable range of the image sensor is widened, the image sensor reaches an end portion of the movable range, and the tracking of the subject cannot be performed, the tracking controller causes the image sensor to stand by at the end portion of the movable range until the subject is focused again.

According to the present aspect, the mode switch for turning on and off the tracking range widening mode is further provided. In a case where the tracking range widening mode is turned on, the subsequent switching operation is stopped in a case where the movable range of the image sensor is widened. That is, in a case where the movable range of the image sensor is widened once, the widened state is continuously maintained. Accordingly, the intention of the photographer can be appropriately reflected on the control. In a case where the movable range of the image sensor is widened, the image sensor reaches the end portion of the movable range, and the tracking of the subject cannot be performed, the image sensor stands by at the end portion of the movable range until the subject is focused again. Accordingly, the image sensor can be early returned to the focusing state.

(13) In the imaging device according to any one of (1) to (12), a reference position is set at a center of the movable range of the image sensor, and the reference position is set at a flange back position defined by the imaging lens.

According to the present aspect, the reference position is set at the center of the movable range of the image sensor. Accordingly, the followability of the tracking can be improved. The center mentioned herein includes a range in the vicinity thereof. That is, a range that can be regarded as approximately the center is included. The reference position is set at the flange back position. In general, the imaging lens is designed so as to have the best performance at the flange back position. Therefore, a high-quality image can be captured by setting the reference position as the flange back position. The flange back position mentioned herein includes a range in the vicinity thereof. That is, a range that can be regarded as a flange back is included.

(14) In the imaging device according to any one of (1) to (13), the focus detector detects the defocus amount based on outputs of a plurality of phase difference detection pixels formed on an imaging surface of the image sensor.

According to the present aspect, the defocus amount is detected based on the outputs of the plurality of phase difference detection pixels formed on the imaging surface of the image sensor. Accordingly, the amount of movement of the image sensor for focusing on the subject can be easily obtained. It is possible to track the subject with high accuracy.

(15) The imaging device according to any one of (1) to (14) further comprises a monitor or an electronic viewfinder on which an image captured by the image sensor is displayed in real time. The monitor and the electronic viewfinder have resolution lower than resolution of the image sensor.

According to the present aspect, the monitor or the electronic viewfinder is provided. The image captured by the image sensor is displayed in real time on the monitor and electronic viewfinder. In a case where the resolution of the monitor and the electronic viewfinder is lower than the resolution of the image sensor, it is difficult to perform the manual focusing with high accuracy while confirming the display on the monitor and the electronic viewfinder. Therefore, in such a case, the AF supporting based on the movement of the image sensor particularly effectively acts.

The resolution mentioned herein is synonymous with pixel density, and is expressed in, for example, pixel per inch (ppi). ppi is fineness of a grid representing the image, and generally represents the number of pixels per inch.

(16) An imaging device main body comprises a mount to and from which an imaging lens having a focus adjustment function is attachable and detachable, an image sensor, an image sensor movement driver that moves the image sensor along an optical axis, a focus detector that detects a defocus amount, a tracking controller that controls the movement of the image sensor within a movable range to track a subject based on the defocus amount detected by the focus detector, a focusing operation detector that detects a focusing operation of the imaging lens for the subject based on a change of the defocus amount detected by the focus detector, and a movable range switch that widens the movable range of the image sensor in a case where the focusing operation is detected by the focusing operation detector.

According to the present aspect, the subject can be tracked by moving the image sensor. The movable range of the image sensor is automatically switched depending on whether or not the focusing operation is performed. The switching is performed by the movable range switch. In a case where the focusing operation is detected, the movable range switch widens the movable range of the image sensor. The case where the focusing operation is performed is a case where the photographer tries to focus on the subject. Therefore, in this case, the focusing operation performed by the photographer can be appropriately supported by widening the movable range of the image sensor and widening the trackable range. Meanwhile, even though the photographer operates the imaging lens, in a case where this operation is not an operation for focusing on the subject, the movable range is not changed and is maintained constant. In a case where the operation is not the focusing operation and the trackable range is widened by widening the movable range of the image sensor, the result does not match the intention of the photographer. Therefore, in a case where the operation is not the focusing operation, the operation matching the intention of the photographer can be performed by maintaining the movable range with no change.

(17) In the imaging device main body according to (16), in a case where the tracking of the subject cannot be performed after the movable range of the image sensor is widened, the movable range switch narrows the movable range of the image sensor to an original range.

According to the present aspect, after the movable range of the image sensor is widened, in a case where the tracking of the subject cannot be performed, the movable range of the image sensor is narrowed and returned to the original range. In a case where the image sensor moves to the end portion of the movable range, the subsequent tracking cannot be performed. In this case, the movable range of the image sensor is narrowed and returned to the original range. That is, the movable range is returned to the movable range before the movable range is widened.

(18) In the imaging device main body according to (16), in a case where a position of an image formation point of the subject is separated from the movable range of the image sensor by a predetermined distance or more after the movable range of the image sensor is widened, the movable range switch narrows the movable range of the image sensor to an original range.

According to the aspect, after the movable range of the image sensor is widened, in a case where the position of the image formation point of the subject is separated from the movable range of the image sensor by the predetermined distance or more, the movable range of the image sensor is narrowed and returned to the original range. The tracking is performed by moving the image sensor so as to follow the movement of the image formation point. Therefore, in a case where the position of the image formation point exceeds the movable range of the image sensor, the tracking cannot be performed. In the present aspect, in a case where the position of the image formation point is separated from the movable range of the image sensor by the predetermined distance or more, the movable range of the image sensor is narrowed and returned to the original range.

(19) In the imaging device main body according to any one of (16) to (18), in a case where the focusing operation is detected by the focusing operation detector, the movable range switch widens the movable range of the image sensor to a predetermined range from zero.

According to the present aspect, in a case where the focusing operation is detected, the movable range of the image sensor is widened to the predetermined range from zero. That is, in a case where the focusing operation is detected, the movable range of the image sensor is set for the first time. Therefore, in this case, the image sensor can initially move in a case where the focusing operation is detected.

(20) In the imaging device main body according to any one of (16) to (19), the focusing operation detector detects the focusing operation by detecting that a fluctuation rate of the defocus amount is equal to or less than a threshold value within a predetermined range before and after a position at which the subject is focused.

According to the present aspect, it is determined that the focusing operation is performed in a case where the fluctuation rate of the defocus amount is equal to or less than the threshold value within the predetermined range before and after the position at which the subject is focused. That is, it is recognized that the focusing operation is performed in a case where the speed of the focus adjustment is reduced at the position in the vicinity of the focusing. The focusing operation can be appropriately detected by detecting that the speed of the focus adjustment is reduced at the position in the vicinity of the focusing.

(21) A focusing control method of an imaging device includes an imaging lens which has a focus adjustment function, an image sensor, an image sensor movement driver which moves the image sensor along an optical axis, a focus detector which detects a defocus amount, and a tracking controller that controls the movement of the image sensor within a movable range to track a subject based on the defocus amount detected by the focus detector. The method comprises a step of detecting a focusing operation of the imaging lens for the subject based on a change of the defocus amount detected by the focus detector, and a step of widening the movable range of the image sensor in a case where the focusing operation is detected.

According to the present aspect, in the case where the subject is tracked by moving the image sensor and the focusing operation is detected, the movable range of the image sensor is widened. The case where the focusing operation is performed is a case where the photographer tries to focus on the subject. Therefore, in this case, the focusing operation performed by the photographer can be appropriately supported by widening the movable range of the image sensor and widening the trackable range. Meanwhile, even though the photographer operates the imaging lens, in a case where this operation is not an operation for focusing on the subject, the movable range is not changed and is maintained constant. In a case where the operation is not the focusing operation and the trackable range is widened by widening the movable range of the image sensor, the result does not match the intention of the photographer. Therefore, in a case where the operation is not the focusing operation, the operation matching the intention of the photographer can be performed by maintaining the movable range with no change.

(22) The focusing control method of an imaging device according to (21) further comprises a step of narrowing the movable range of the image sensor to an original range in a case where the tracking of the subject cannot be performed after the movable range of the image sensor is widened.

According to the present aspect, after the movable range of the image sensor is widened, in a case where the tracking of the subject cannot be performed, the movable range of the image sensor is narrowed and returned to the original range. In a case where the image sensor moves to the end portion of the movable range, the subsequent tracking cannot be performed. In this case, the movable range of the image sensor is narrowed and returned to the original range. That is, the movable range is returned to the movable range before the movable range is widened.

(23) The focusing control method of an imaging device according to (21) further comprises a step of narrowing the movable range of the image sensor to an original range in a case where a position of an image formation point of the subject is separated from the movable range of the image sensor by a predetermined distance or more after the movable range of the image sensor is widened.

According to the aspect, after the movable range of the image sensor is widened, in a case where the position of the image formation point of the subject is separated from the movable range of the image sensor by the predetermined distance or more, the movable range of the image sensor is narrowed and returned to the original range. The tracking is performed by moving the image sensor so as to follow the movement of the image formation point. Therefore, in a case where the position of the image formation point exceeds the movable range of the image sensor, the tracking cannot be performed. In the present aspect, in a case where the position of the image formation point is separated from the movable range of the image sensor by the predetermined distance or more, the movable range of the image sensor is narrowed and returned to the original range.

(24) In the focusing control method of an imaging device according to any one of (21) to (23), in the step of widening the movable range of the image sensor in a case where the focusing operation is detected, the movable range of the image sensor is widened to a predetermined range from zero.

According to the present aspect, in a case where the focusing operation is detected, the movable range of the image sensor is widened to the predetermined range from zero. That is, the movable range of the image sensor is set for the first time in a case where the focusing operation is detected. Therefore, in this case, the image sensor can initially move in a case where the focusing operation is detected.

(25) In the focusing control method of an imaging device according to any one of (21) to (24), in the step of detecting the focusing operation, the focusing operation is detected by detecting that a fluctuation rate of the defocus amount is equal to or less than a threshold value within a predetermined range before and after a position at which the subject is focused.

According to the present aspect, it is determined that the focusing operation is performed in a case where the fluctuation rate of the defocus amount is equal to or less than the threshold value within the predetermined range before and after the position at which the subject is focused. That is, it is recognized that the focusing operation is performed in a case where the speed of the focus adjustment is reduced at the position in the vicinity of the focusing. The focusing operation can be appropriately detected by detecting that the speed of the focus adjustment is reduced at the position in the vicinity of the focusing.

According to the present invention, a photographer can be appropriately supported during focusing.

BRIEF DESCRIPTION OF THE DRAWINGS

FIGS. 8A and 8B are conceptual diagrams of a case where focusing is performed by moving the image sensor.

FIGS. 9A and 9B are conceptual diagrams of tracking control based on the movement of the image sensor.

FIG. 12 is a flowchart showing a processing procedure of the tracking control in a case where a tracking function is turned on.

FIG. 22 is a diagram showing an example in a case where the present invention is applied to a three-sensor digital camera.

DESCRIPTION OF THE PREFERRED EMBODIMENTS

Hereinafter, preferred embodiments for carrying out the present invention will be described in detail with reference to the accompanying drawings.

[Appearance Configuration]

Figure 1:
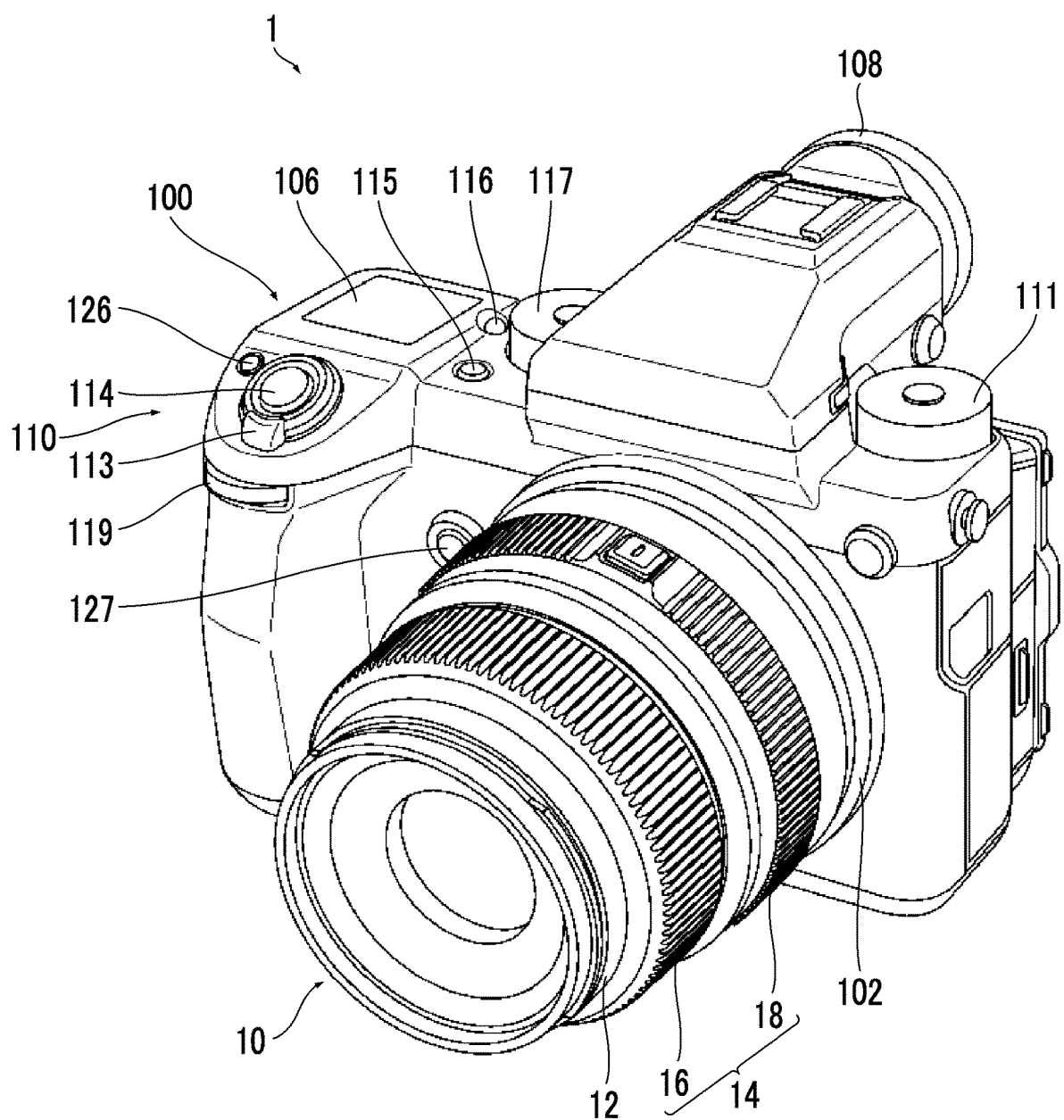
FIG. 1 is a front perspective view showing an embodiment of a digital camera.
Figure 2:
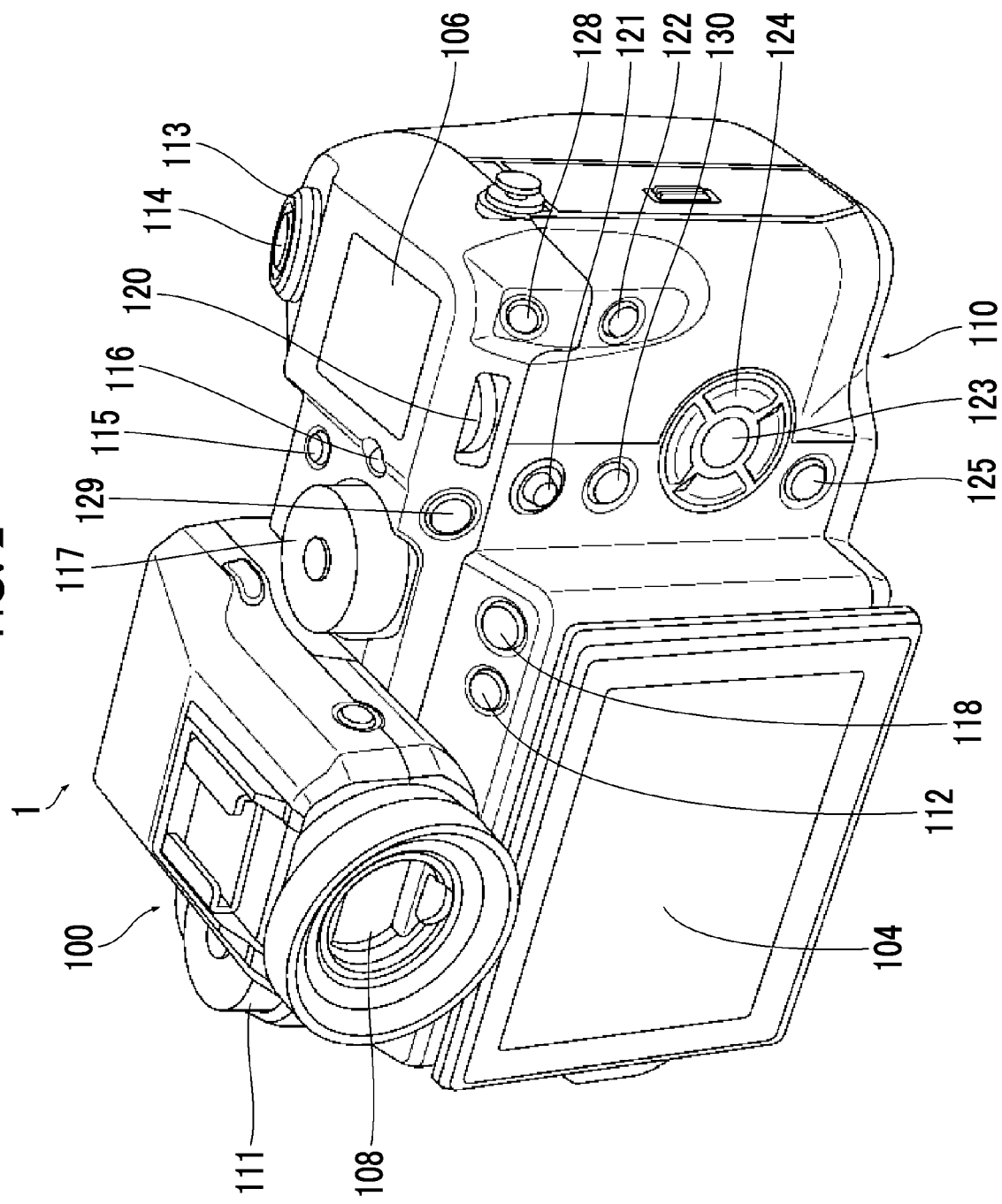
FIG. 2 is a rear perspective view showing an embodiment of the digital camera.

FIGS. 1 and 2 are a front perspective view and a rear perspective view showing an embodiment of a digital camera to which the present invention is applied.

A digital camera 1 shown in FIGS. 1 and 2 is an interchangeable lens type digital camera, and comprises an interchangeable lens 10 and a camera main body 100. The digital camera 1 is an example of an imaging device.

<<Interchangeable Lens>>

The interchangeable lens 10 is an example of an imaging lens, and is a combination of a plurality of lenses. The interchangeable lens 10 has a focus adjustment function, and a focus is adjusted by moving some lens groups or all lens groups along an optical axis. In the present example, the focus is adjusted by moving a focus lens composed of some lens groups along the optical axis.

The interchangeable lens 10 comprises a focus ring 16 and a stop ring 18, as a lens operator 14.

The focus ring 16 is an operation member for focus adjustment. The focus ring 16 is provided to be rotatable around a lens barrel 12. In a case where the focus ring 16 is rotated, a focus adjustment mechanism is operated according to an operation direction and an operation amount. That is, the focus lens moves according to the operation direction and the operation amount, and the focus is adjusted.

The stop ring 18 is an operation member for adjusting a stop. The stop ring 18 is provided to be rotatable around the lens barrel 12. F numbers capable of being set on an outer periphery of the stop ring 18 are printed at regular intervals (not shown). The setting of the stop is performed by rotating the stop ring 18 and adjusting the F number desired to be set at a position of an index (not shown) provided on the lens barrel 12.

<<Camera Main Body>>

A camera main body 100 is an example of an imaging device main body. The camera main body 100 comprises a mount 102, a main monitor 104, a sub monitor 106, an electronic viewfinder 108, and a camera operator 110.

The mount 102 is an attachment of the interchangeable lens 10, and is provided on a front surface of the camera main body 100. The interchangeable lens 10 is attachable and detachable to and from the mount 102.

The main monitor 104 is provided on a rear surface of the camera main body 100. The main monitor 104 includes a liquid crystal display (LCD). The main monitor 104 is used as a graphical user interface (GUI) at the time of performing various settings, and is also used as a monitor for reproducing captured images. At the time of imaging, a live view is displayed as necessary, and an image captured by an image sensor is displayed in real time.

The sub monitor 106 is provided on an upper surface of the camera main body 100. The sub monitor 106 includes an LCD. The sub monitor 106 displays main imaging information such as shutter speed, a F number, sensitivity, and exposure correction.

The electronic viewfinder (EVF) 108 is provided on an upper portion of the camera main body 100. The live view is displayed on the electronic viewfinder 108, and the image captured by the image sensor in real time is displayed. The electronic viewfinder 108 can be turned on and off as necessary, and can be switched to the display of the main monitor 104.

The camera operator 110 comprises, as operation members of the digital camera 1, a sensitivity dial 111, a delete button 112, a power lever 113, a shutter button 114, a drive button 115, a sub monitor illumination button 116, a shutter speed dial 117, a playback button 118, a front command dial 119, a rear command dial 120, a focus lever 121, a quick menu button 122, a menu/OK button 123, a selector button 124, a display/BACK button 125, a first function button 126, a second function button 127, a third function button 128, a fourth function button 129, and a fifth function button 130.

The sensitivity dial 111 is a dial for setting sensitivity. The delete button 112 is a button for deleting the captured image. In a case where the button is pushed during the reproduction of the image, the image being reproduced is deleted. The power lever 113 is a lever that turns on and off the power of the digital camera 1. The shutter button 114 is a button for instructing recording of an image. The shutter button 114 is a two-stroke button capable of being pushed halfway and fully. In a case where the shutter button 114 is pushed halfway, an S1ON signal is output, and in a case where the shutter button is pushed fully, an S2ON signal is output. In a case where a still image is captured, imaging preparation is performed by pushing the shutter button 114 halfway, and image recording is performed by fully pushing the shutter button. In a case where a moving image is captured, imaging is started by fully pushing the shutter button 114 for the first time, and imaging is ended by fully pushing the shutter button 114 for the second time. The drive button 115 is a button for calling a selection screen of a drive mode. In a case where the drive button 115 is pushed, the selection screen of the drive mode is displayed on the main monitor 104. The drive mode is selected on the selection screen of the drive mode, and single frame imaging, continuous imaging, bracket imaging, multiple exposures, and moving image imaging are selected. The sub monitor illumination button 116 is a button for turning on and off the illumination of the sub monitor 106. The shutter speed dial 117 is a dial for setting the shutter speed. The playback button 118 is a button for instructing switching to the playback mode. In a case where the digital camera 1 is activated in an imaging mode and the playback button 118 is pushed, the digital camera 1 is switched to the playback mode. In a case where the shutter button 114 is pushed in the playback mode, the mode is switched to the imaging mode. Functions corresponding to states of the digital camera 1 are assigned to the front command dial 119 and the rear command dial 120. The focus lever 121 is a lever that selects an AF area. The quick menu button 122 is a button for calling a quick menu. In a case where the quick menu button 122 is pushed, the quick menu is displayed on the main monitor 104. In the quick menu, items registered by a user among items capable of being set in the digital camera 1 are displayed. The menu/OK button 123 is a button for calling a menu screen. In a case where the menu/OK button 123 is pushed, the menu screen is displayed on the main monitor 104. The menu/OK button 123 also functions as a button for confirming a selected item. The selector button 124 is a so-called cross button, and is a button capable of instructing in four directions. In a case where various settings are performed, the selector button 124 is used to select an item. The display/BACK button 125 is a button for switching between display contents of the main monitor 104. The display/BACK button 125 also functions as a button for canceling the selected item, that is, a button for returning to the previous state. Functions selected by the user from among functions prepared in advance are assigned to the first function button 126, the second function button 127, the third function button 128, the fourth function button 129, and the fifth function button 130. For example, a function for switching between turned on and off a tracking function is assigned.

Figure 3:
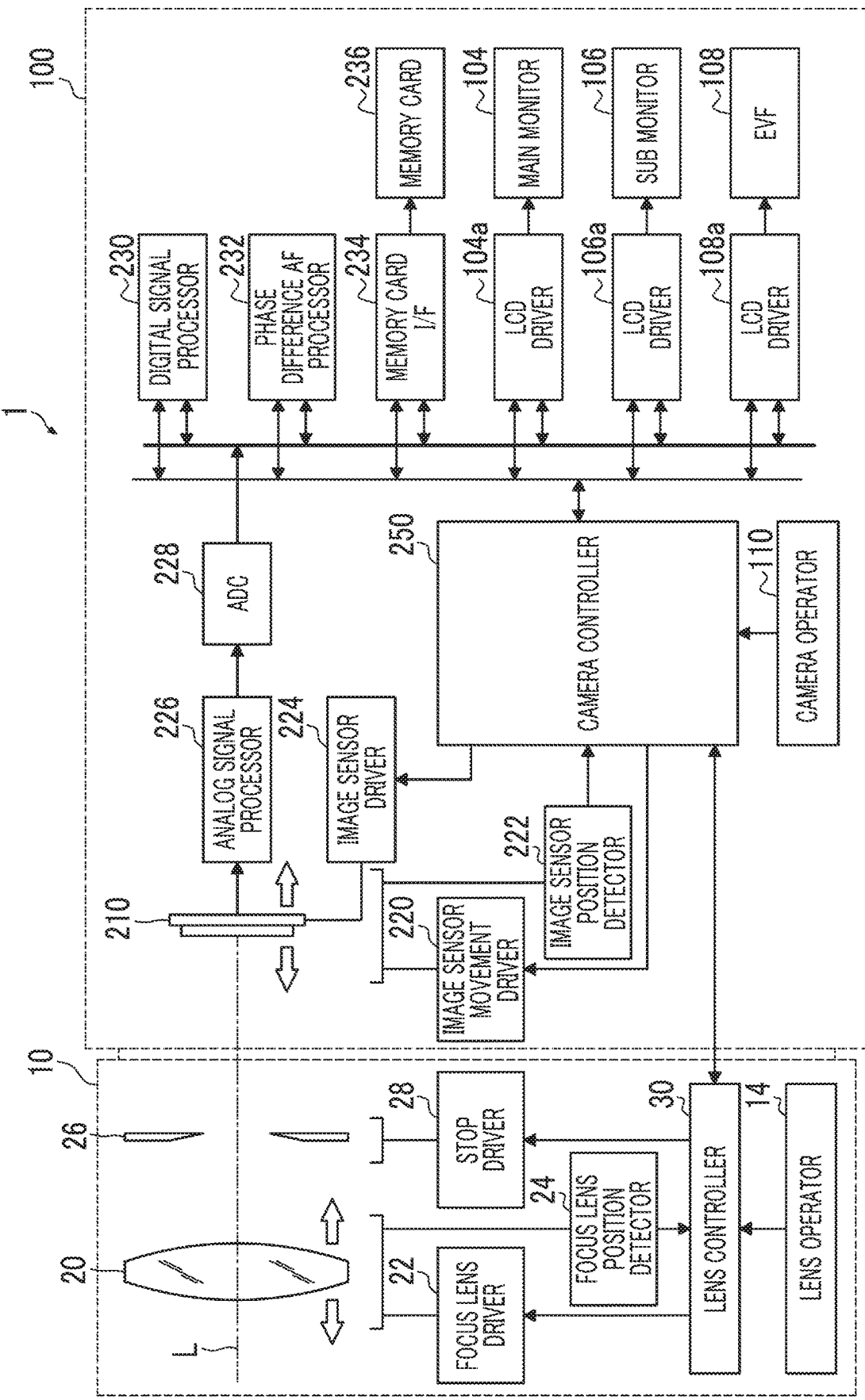
FIG. 3 is a block diagram showing an electric configuration of the digital camera.

[Electric Configuration] FIG. 3 is a block diagram showing an electric configuration of the digital camera.

The interchangeable lens 10 attached to the camera main body 100 is electrically connected to the camera main body 100 via a contact point (not shown) provided on the mount 102.

<<Interchangeable Lens>>

The interchangeable lens 10 comprises a focus lens 20, a focus lens driver 22, and a focus lens position detector 24, as a focus adjustment mechanism.

The focus lens 20 is a part of a plurality of lenses constituting the interchangeable lens 10. The focus of the interchangeable lens 10 is adjusted by moving the focus lens 20 back and forth along an optical axis L.

The focus lens driver 22 moves the focus lens 20 back and forth along the optical axis L. The focus lens driver 22 comprises, for example, an actuator such as a linear motor and a drive circuit thereof.

The focus lens position detector 24 detects a position of the focus lens 20. The focus lens position detector 24 includes, for example, a photo interrupter and a magneto resistive (MR) sensor. The photo interrupter detects that the focus lens 20 is located at a predetermined origin position. The MR sensor detects the amount of movement of the focus lens 20. The MR sensor can detect the position of the focus lens 20 relative to the origin position by detecting that the focus lens 20 is located at the origin position by the photo interrupter and detecting the amount of movement of the focus lens 20 from the origin position by the MR sensor.

The interchangeable lens 10 comprises a stop 26 and a stop driver 28, as a light amount adjustment mechanism. The stop 26 is, for example, an iris stop. The stop driver 28 comprises a motor that drives stop leaf blades of the stop 26 and a drive circuit thereof.

The interchangeable lens 10 comprises a lens controller 30 that generally controls the overall operation of the interchangeable lens 10. The lens controller 30 is, for example, a microcomputer, and functions as a focus lens drive controller 30a and a stop drive controller 30b by executing a predetermined control program (see FIG. 7).

The focus lens drive controller 30a controls the focus lens driver 22 based on an operation signal from the lens operator 14, and controls the movement of the focus lens 20. Specifically, the focus lens drive controller controls the focus lens driver 22 such that the focus lens 20 moves in a direction and a movement amount corresponding to the operation direction and the operation amount of the focus ring 16. In a case where the focus ring 16 is operated, the lens operator 14 outputs an operation signal corresponding to the operation direction and operation amount to the lens controller 30.

The stop drive controller 30*b* controls the stop 26 by controlling the stop driver 28 based on the operation signal from the lens operator 14. Specifically, the stop drive controller controls the stop driver 28 such that the F number set by the stop ring 18 is obtained. In a case where the stop ring 18 is operated, the lens operator 14 outputs the operation signal corresponding to the set F number to the lens controller 30.

In a case where the interchangeable lens 10 is attached to the camera main body 100, the lens controller 30 is connected so as to communicate with the camera controller 250 of the camera main body 100.

<<Camera Main Body>>

The camera main body 100 comprises an image sensor 210, an image sensor movement driver 220, an image sensor position detector 222, an image sensor driver 224, an analog signal processor 226, an analog-to-digital converter (ADC) 228, a digital signal processor 230, a phase difference AF processor 232, a memory card interface 234, a memory card 236, the main monitor 104, the sub monitor 106, the electronic viewfinder (EVF) 108, the camera operator 110, and a camera controller 250.

<Image Sensor>

The image sensor 210 receives light passing through the interchangeable lens 10, and images a subject. The image sensor 210 includes a solid-state imaging element such as a charged coupled device (CCD) or a complementary metal oxide semiconductor (CMOS). The image sensor 210 has a plurality of phase difference detection pixels on an imaging surface.

Figure 4:
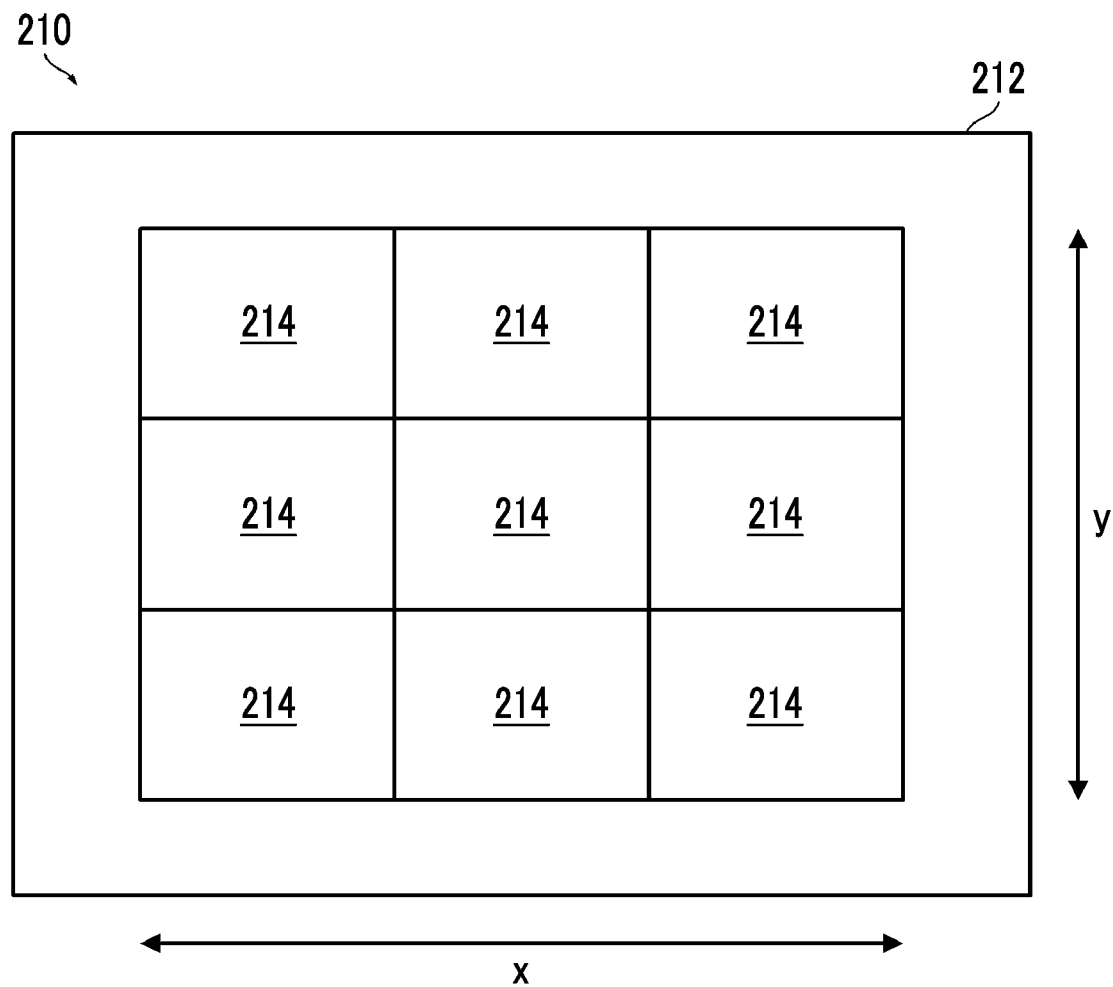
FIG. 4 is a diagram showing a schematic configuration of an image sensor.

FIG. 4 is a diagram showing a schematic configuration of the image sensor.

The image sensor 210 has an imaging surface 212 on which a plurality of pixels is two-dimensionally arranged in an x direction (row direction) and a y direction (column direction). The imaging surface 212 has a plurality of AF (autofocus) areas 214. The AF area 214 is an area set on the imaging surface 212 as an area in which focusing can be performed. In the example shown in FIG. 4, nine AF areas 214 are set at a central portion of a screen.

Figure 5:
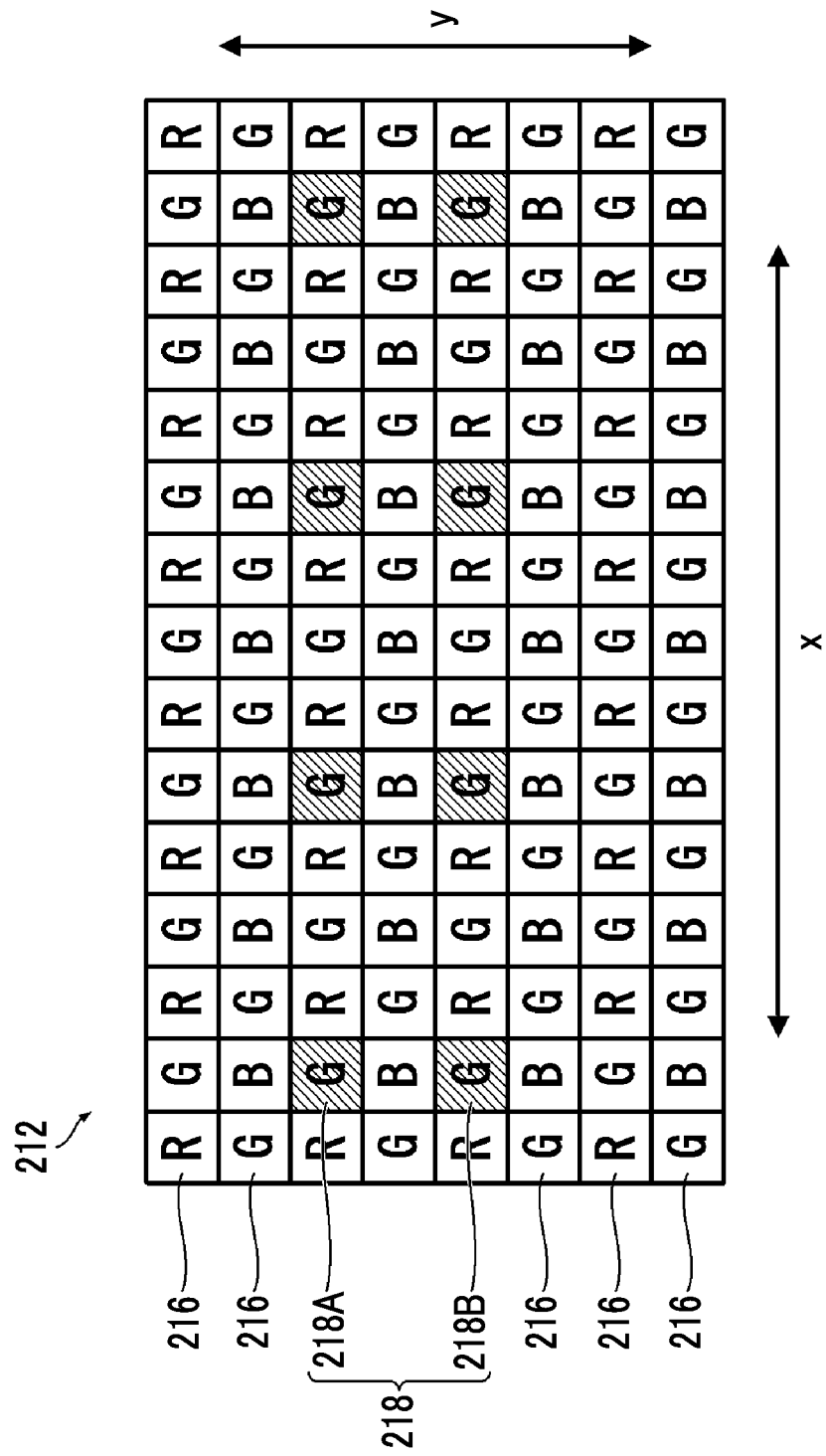
FIG. 5 is an enlarged view of a part of an imaging surface.

FIG. 5 is an enlarged view of a part of the imaging surface.

The plurality of pixels is regularly arranged on the imaging surface 212. Each pixel comprises a photoelectric conversion unit and outputs a signal corresponding to the amount of received light. Each pixel has a color filter of any color of red (R), green (G), and blue (B). The color filters are assigned to the pixels so as to have a predetermined arrangement. FIG. 5 shows an example of a Bayer array. In this diagram, a letter R is given to a pixel (R pixel) having the color filter of R, a letter G is given to a pixel (G pixel) having the color filter of G, and a letter B is given to a pixel (B pixel) having the color filter of B.

Normal pixels 216 and phase difference detection pixels 218 are arranged in the AF area. The normal pixel 216 is a normal imaging pixel. The phase difference detection pixel 218 is a pixel that detects a phase difference. The pixels other than the phase difference detection pixels are the normal pixels. Only the normal pixels are arranged in areas other than the AF areas.

In FIG. 5, the phase difference detection pixels 218 are indicated by diagonal lines. As shown in this diagram, the phase difference detection pixels 218 are regularly arranged on the imaging surface 212.

The phase difference detection pixels 218 include first phase difference detection pixels 218A and second phase difference detection pixels 218B. The first phase difference detection pixels 218A and the second phase difference detection pixels 218B are arranged close to each other. In the example shown in FIG. 5, the first phase difference detection pixels 218A are arranged at regular intervals in one of two rows of the same array adjacent to each other, and the second phase difference detection pixels 218B are arranged at regular intervals on the other row. In particular, an example in which specific G pixels in a specific row in which the R pixels and the G pixels are arranged are used as the phase difference detection pixels is shown.

Figure 6:
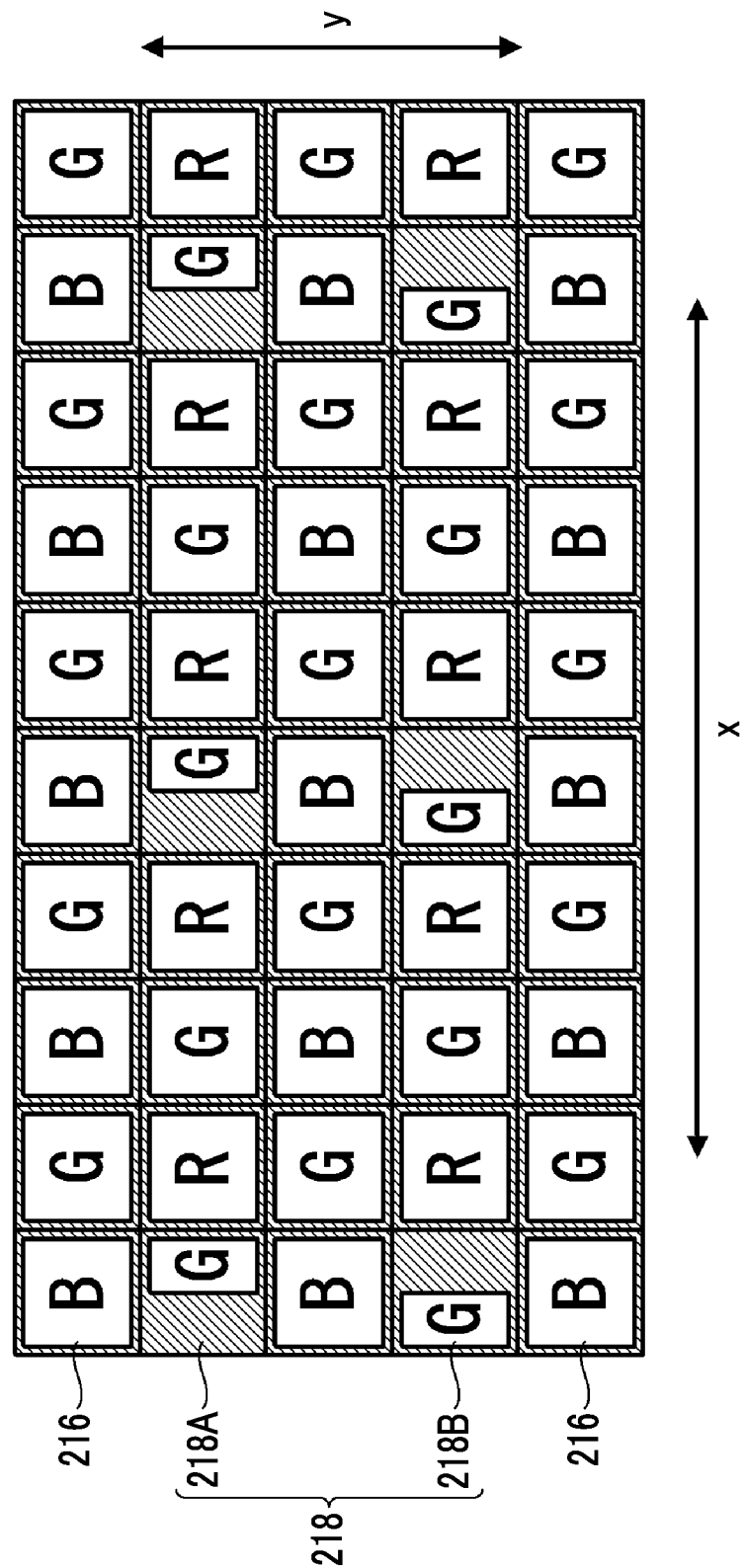
FIG. 6 is a diagram showing a schematic configuration of pixels formed on the imaging surface.

FIG. 6 is a diagram showing a schematic configuration of pixels formed on an imaging surface.

Each pixel has a light shielding film comprising a predetermined opening portion. In FIG. 6, the opening portion of the light shielding film formed in each pixel is represented in white.

The normal pixel 216 has a light shielding film of which an opening portion coincides with a center of the photoelectric conversion unit. The normal pixel 216 receives light rays passed through almost the entire pupil region of the interchangeable lens 10.

The first phase difference detection pixel 218A has a light shielding film of which an opening portion is eccentric to a right side with respect to the center of the photoelectric conversion unit. As a result, the first phase difference detection pixel 218A receives one of a pair of light rays passed through different portions of the pupil region of the interchangeable lens 10.

The second phase difference detection pixel 218B has a light shielding film of which an opening portion is eccentric to a left side with respect to the center of the photoelectric conversion unit. As a result, the second phase difference detection pixel 218B receives the other of the pair of light rays passed through the different portions of the pupil region of the interchangeable lens 10.

With the aforementioned configuration, it is possible to detect a phase difference amount by acquiring signals of the first phase difference detection pixel 218A and the second phase difference detection pixel 218B and comparing these pixels.

<Image Sensor Movement Driver>

The image sensor movement driver 220 moves the image sensor 210 back and forth along the optical axis L. The image sensor movement driver 220 comprises, for example, an actuator such as a piezo actuator and a drive circuit thereof.

The image sensor 210 moves within the movable range. The movable range is set within a range in which the image sensor 210 can be physically moved by the image sensor movement driver 220. As will be described below, the movable range is switched by the movable range switch 250*c* (see FIG. 7).

A reference position is set at a center of the movable range. The reference position is set at a flange back position defined by the interchangeable lens 10. In general, the interchangeable lens 10 is optically designed by using the flange back position as a reference. Therefore, the optical performance of the interchangeable lens 10 can be maximized by positioning the image sensor 210 at the reference position.

For example, a flange back of an interchangeable lens employing a C mount is 17.526 mm. A flange back of an interchangeable lens employing a CS mount is 12.5 mm.

<Image Sensor Position Detector>

The image sensor position detector 222 detects the position of the image sensor 210 relative to the reference position. The image sensor position detector 222 includes, for example, a displacement sensor such as an eddy current sensor.

<Image Sensor Driver>

The image sensor driver 224 drives the image sensor 210 under the control of the camera controller 250. The image sensor 210 is driven by the image sensor driver 224 to image an image.

<Analog Signal Processor>

The analog signal processor 226 acquires an analog image signal for each pixel output from the image sensor 210, and performs predetermined signal processing (for example, sampling two correlation pile and amplification processing).

<ADC>

The ADC 228 converts the analog image signals output from the analog signal processor 226 into digital image signals, and outputs the digital image signals.

<Digital Signal Processor>

The digital signal processor 230 acquires the digital image signals, and generates image data by performing predetermined signal processing (for example, gradation transformation processing, white balance correction processing, gamma-correction processing, demosaicing processing, and YC conversion processing).

<Phase Difference AF Processor>

The phase difference autofocus (AF) processing unit 232 is an example of a focus detector. The phase difference AF processor 232 acquires the signals of the first phase difference detection pixels 218A and the second phase difference detection pixels 218B from the designated AF area 214, and calculates the phase difference amount by performing correlation calculation processing on the acquired signals. A defocus direction and amount are calculated based on the calculated phase difference amount. The AF area is selected by the user. Alternatively, the AF area is automatically decided. The selection of the user is performed by operating the focus lever 121. In a case where the AF area is automatically decided, for example, the subject is automatically recognized, and the AF area where the subject is present is selected. Alternatively, a moving object is recognized, and an AF area where the moving object is present is selected.

<Memory Card Interface and Memory Card>

The memory card interface 234 reads and writes data from and in the memory card 236 attached to a card slot under the control of the camera controller 250.

<Main Monitor>

The main monitor 104 includes an LCD. The display on the main monitor 104 is controlled by the camera controller 250. The camera controller 250 controls the display on the main monitor 104 via an LCD driver 104a.

<Sub Monitor>

The sub monitor 106 includes an LCD. The display on the sub monitor 106 is controlled by the camera controller 250. The camera controller 250 controls the display on the sub monitor 106 via an LCD driver 106a.

<Electronic Viewfinder>

The display unit of the electronic viewfinder (EVF) 108 is an LCD. The display on the electronic viewfinder 108 is controlled by the camera controller 250. The camera controller 250 controls the display on the electronic viewfinder 108 via an LCD driver 108a.

<Camera Operator>

The camera operator 110 outputs a signal corresponding to the operation of each operation member to the camera controller 250.

<Camera Controller>

The camera controller 250 is a controller that generally controls the entire operation of the digital camera 1. The camera controller 250 includes, for example, a microcomputer, and provides various functions by executing predetermined programs.

Figure 7:
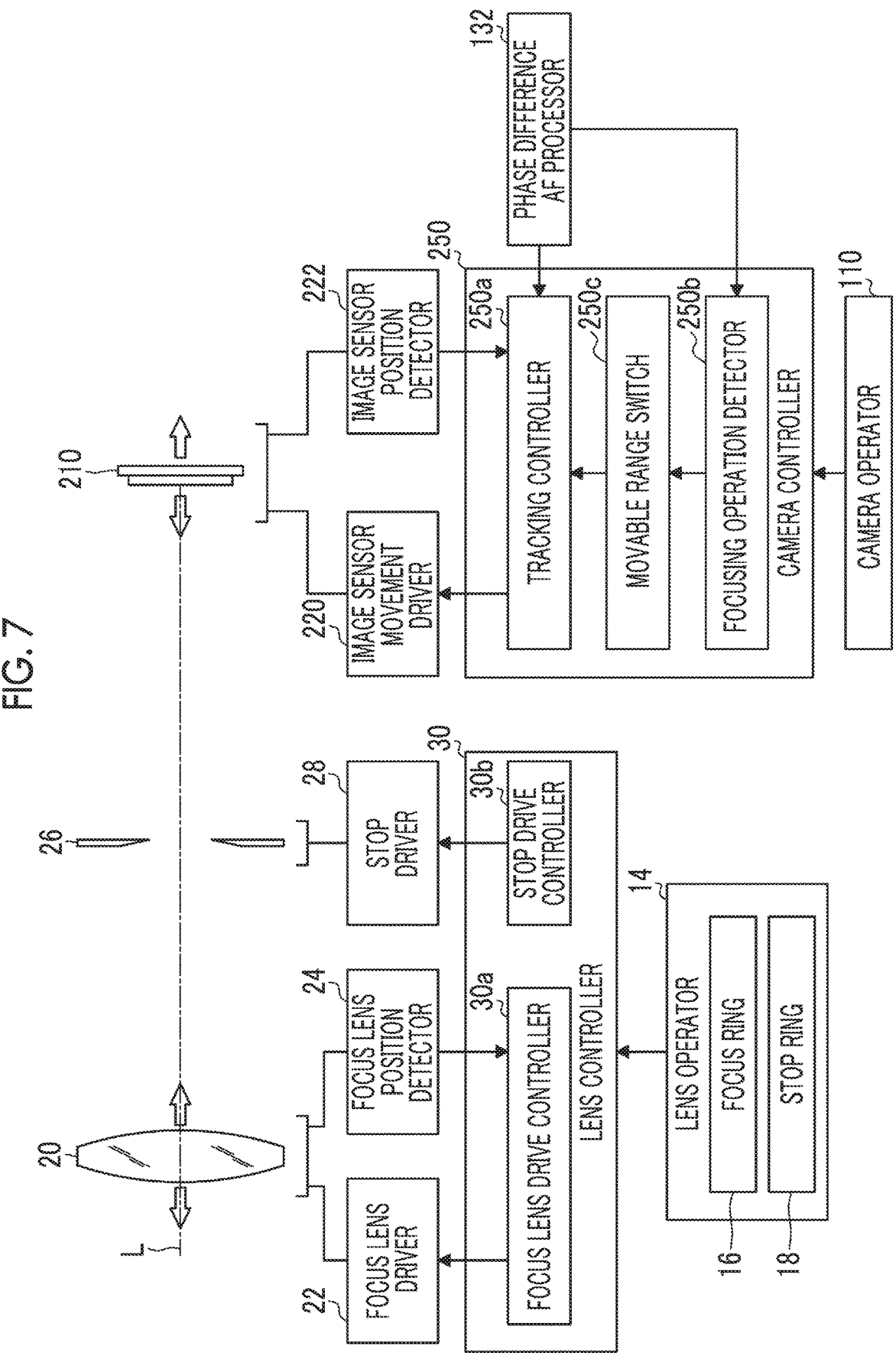
FIG. 7 is a block diagram of functions realized by a camera controller and a lens controller.

FIG. 7 is a block diagram of functions realized by the camera controller and the lens controller.

As shown in FIG. 7, the camera controller 250 functions as a tracking controller 250a, a focusing operation detector 250b, and a movable range switch 250c by executing a predetermined program.

[Tracking Controller]

The tracking controller 250a controls the movement of the image sensor 210 to track the subject based on a defocus amount detected by the phase difference AF processor 232. The tracking is performed by controlling the movement of the image sensor 210 so as to maintain a focusing state.

Here, the focusing based on the movement of the image sensor 210 will be described.

FIGS. 8A and 8B are conceptual diagrams a case where the focusing is performed based on the movement of the image sensor. FIG. 8A shows a state in a case where the focus is shifted, and FIG. 8B shows the focusing state.

As shown in FIG. 8A, it is assumed that the image sensor 210 is located at a reference position R0 and an image of a subject A at a position P1 is formed at a position R1. As shown in FIG. 8A, it is assumed that the position R1 is behind (image plane side) from the reference position R0. In this case, the image sensor 210 is moved backward, and is located at the position R1 as shown in FIG. 8B. Accordingly, the image of the subject A is formed on the imaging surface, and is focused.

In this manner, the subject can be focused by moving the image sensor 210 to a position at which the image of the subject is formed, that is, a position of an image formation point. In order to maintain the focusing state, the image sensor 210 may be moved so as to follow the movement of the image formation point. Therefore, the tracking is performed by moving the image sensor 210 so as to follow the movement of the image formation point. A shift amount between the position of the image formation point and the position of the imaging surface is detected as the defocus amount. Therefore, the tracking controller 250a controls the movement of the image sensor 210 to maintain the focusing state based on the defocus amount.

FIGS. 9A and 9B are conceptual diagrams of tracking control based on the movement of the image sensor.

FIG. 9A shows a case where the subject A moves from the position P1 to a position P2, and a position R2 of the image formation point reaches an end portion of a movable range W of the image sensor 210. The tracking controller 250a performs the tracking until the image sensor 210 reaches the end portion of the movable range W. That is, the image sensor movement controller controls the movement of the image sensor 210 to maintain the focusing state based on the defocus amount.

FIG. 9B shows a case where the subject A further moves from the position P2 to a position P3 and a position R3 of the image formation point moves beyond the end portion of the movable range W of the image sensor 210. In a case where the image sensor 210 reaches the end portion of the movable range W, the tracking cannot be performed thereafter. In a case where the image sensor 210 reaches the end portion of the movable range W, the tracking controller 250a ends the tracking. In a case where the tracking is ended, the tracking controller 250a returns the image sensor 210 to the reference position R0.

In a case where the image sensor 210 is returned to the reference position R0, the tracking controller 250a moves the image sensor 210 at a moving speed corresponding to a change of the defocus amount. In a case where the image sensor 210 is returned to the reference position R0, since the focus state is changed, there is a concern that an unnatural image will be formed. However, the image sensor 210 can be returned to the reference position R0 without giving an uncomfortable feeling to the image by moving the image sensor 210 at the moving speed corresponding to the change of the defocus amount. Here, the image sensor 210 is returned to the reference position R0 by moving the image sensor 210 at the approximately same speed (the same speed or a substantially same speed) as a speed at which the defocus amount is changed. That is, the image sensor 210 is returned to the reference position R0 by moving the image sensor 210 at the same speed as the moving speed of the image formation point.

Hereinafter, the processing of the tracking control over time will be described. Here, a case where the movable range of the image sensor 210 is constant will be described as an example for the sake of simplification in description.

Figure 10:
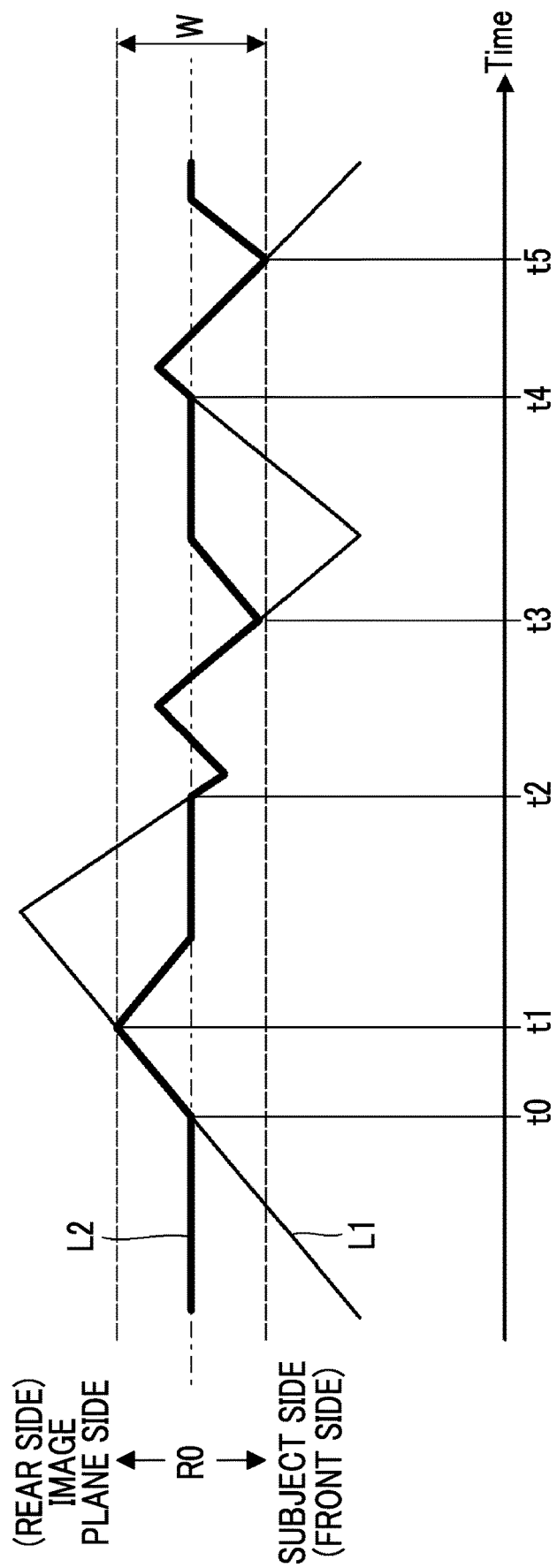
FIG. 10 is a conceptual diagram of the tracking control over time.

FIG. 10 is a conceptual diagram of tracking control over time.

In this diagram, a reference L1 denotes a movement locus of the image formation point, and a reference L2 denotes a movement locus of the image sensor 210.

As shown in this diagram, in a case where the focusing is performed, the tracking is started. That is, the tracking is started in a case where the image formation point is located on the imaging surface of the image sensor 210 located at the reference position R0. In a case where the image formation point is located on the imaging surface of the image sensor 210, the defocus amount becomes zero. Therefore, the tracking is started in a case where the defocus amount becomes zero.

In the example shown in FIG. 10, the focusing is initially performed at timing t0. Therefore, the tracking is started from timing t0. As shown in FIG. 10, the movement of the image sensor 210 is started after the focusing is performed at timing t0. The image sensor 210 moves following the movement of the image formation point. Accordingly, the focusing state is maintained.

The image sensor 210 moves within the movable range. In the example shown in FIG. 10, the image sensor 210 reaches the end portion of the movable range W at timing t1 after the focusing is performed at timing t0. In this case, the tracking is temporarily ended. When the tracking is ended, the image sensor 210 is returned to the reference position R0. At this time, the image sensor is returned to the reference position R0 by moving at the substantially same speed as the moving speed of the image formation point.

In a case where the image sensor is returned to the reference position R0, the image sensor 210 stands by at the reference position R0 until the focusing is performed again. The example shown in FIG. 10 shows a case where the focusing is performed again at timing t2. In this case, the tracking is resumed from timing t2. In the example shown in FIG. 10, the image sensor 210 reaches the end portion of the movable range W at timing t3, and after the focusing is performed again at timing t4, the image sensor 210 reaches the end portion of the movable range W at timing t5. As shown in this diagram, the tracking is ended whenever the image sensor 210 reaches the end portion of the movable range W. In a case where the tracking is ended, the image sensor 210 is returned to the reference position R0. In a case where the image sensor 210 is returned to the reference position R0, the image sensor stands by until the focusing is performed again, and in a case where the focusing is performed, the tracking is resumed.

As described above, in a case where the focusing is performed, the tracking controller 250a starts the tracking, moves the image sensor 210 within the movable range, and maintains the focusing state. Meanwhile, in a case where the image sensor 210 reaches the end portion of the movable range W, the tracking is ended, the image sensor 210 is returned to the reference position R0, and stands by until the focusing is performed again.

[Focusing Operation Detector]

The focusing operation detector 250b detects a focusing operation on the subject. The focusing operation is an operation for focusing on the subject by adjusting the focus of the imaging lens having the focus adjustment function. The focusing operation detector 250b detects the focusing operation based on the defocus amount detected by the phase difference AF processor 232. In the present embodiment, the focusing operation is detected by detecting that a fluctuation rate of the defocus amount is equal to or less than a threshold value within a predetermined range before and after the position at which the subject is focused. That is, in a case where the speed of the focus adjustment of the imaging lens performed by the focus lens is reduced at a position near the focusing, the focusing operation detector recognizes and detects that the focusing operation is performed. In general, in a case where the subject is focused, the photographer performs fine adjustment by reducing the speed in the vicinity of the focusing. The focusing operation can be appropriately detected by detecting that the speed of the focus adjustment is reduced at the position in the vicinity of the focusing. Therefore, the predetermined range before and after the position at which the subject is focused is set to a range in the vicinity of the position at which the subject is focused.

[Movable Range Switch]

The movable range switch 250c switches the movable range of the image sensor 210 based on the detection result of the focusing operation detector 250b. The switching is performed between a first movable range and a second movable range. The first movable range is a narrow movable range, and the second movable range is a wide movable range. Therefore, the movable range of the image sensor 210 is widened by switching from the first movable range to the second movable range. Meanwhile, the movable range of the image sensor 210 is narrowed by switching from the second movable range to the first movable range. For example, the second movable range is set to a maximum range in which the image sensor can be moved by the image sensor movement driver 220. Meanwhile, the first movable range is set to a range narrower than the second movable range.

In a case where the tracking function is turned on, the movable range switch 250c sets the movable range of the image sensor 210 to the first movable range. Thereafter, in a case where the focusing operation is detected by the focusing operation detector 250b, the movable range switch 250c switches the movable range of the image sensor from the first movable range to the second movable range. Accordingly, the movable range is widened.

After the movable range of the image sensor 210 is widened, that is, after being switched to the second movable range, in a case where the tracking of the subject cannot be performed, the movable range switch 250c switches the movable range of the image sensor 210 to the first movable range. Accordingly, the movable range of the image sensor is returned to the original state before the movable range is widened.

Figure 11:
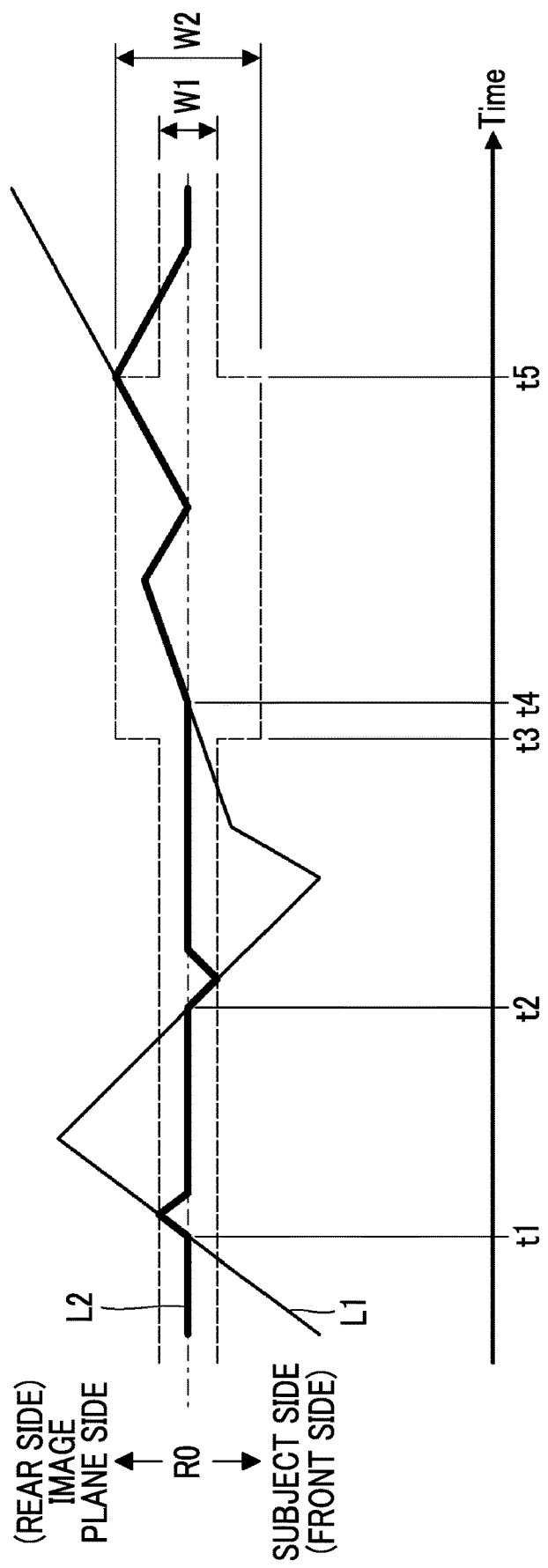
FIG. 11 is a conceptual diagram of switching of a movable range.

FIG. 11 is a conceptual diagram of the switching of the movable range.

In this diagram, a reference L1 denotes a movement locus of the image formation point, and a reference L2 denotes a movement locus of the image sensor 210. A reference W1 denotes the first movable range, and a reference W2 denotes the second movable range. As shown in this diagram, the second movable range W2 is set to be wider than the first movable range W1.

As described above, in a case where the focusing operation is detected by the focusing operation detector 250b, the first movable range W1 is switched to the second movable range W2. The focusing operation detector 250b detects the focusing operation by detecting that the fluctuation rate of the defocus amount is equal to or less than the threshold value within the predetermined range before and after the position at which the subject is focused. The fluctuation rate of the defocus amount is synonymous with a moving speed of the image formation point. Therefore, in FIG. 11, an inclination of a movement locus L1 of the image formation point is the fluctuation rate of the defocus amount. The position at which the subject is focused is the position of the image sensor 210 (more precisely, the position of the imaging surface). Therefore, the focusing operation is detected by detecting that the fluctuation rate of the defocus amount is equal to or less than the threshold value within the predetermined range before and after the image sensor 210. The predetermined range before and after the image sensor is a range in the vicinity of the image sensor 210. In the example shown in FIG. 11, the same range as the first movable range W1 is set. Therefore, in the example shown in FIG. 11, in a case where the fluctuation rate of the defocus amount is equal to or less than the threshold value in the first movable range W1, the movable range is switched from the first movable range W1 to the second movable range W2. The threshold value is set with consideration for the speed at the time of finely adjusting the focus.

In the example shown in FIG. 11, the subject is focused at timings t1, t2, and t4.

In the first and second focusing (focusing at timings t1 and t2), since the focusing operation is not detected, the movable range of the image sensor 210 is maintained in the first movable range W1. That is, since the fluctuation rate of the defocus amount in the vicinity of the focusing exceeds the threshold value, the focusing operation is recognized not to be performed, and the movable range is maintained in the first movable range W1.

In the third focusing (focusing at timing t4), since the focusing operation is detected, the movable range of the image sensor 210 is widened from the first movable range W1 to the second movable range W2. That is, since the fluctuation rate of the defocus amount in the vicinity of the focusing is equal to or less than the threshold value, the focusing operation is recognized to be performed, and the movable range is widened from the first movable range W1 to the second movable range W2. In the example shown in FIG. 11, the focusing operation is recognized to be performed at timing t3, and the movable range is widened from the first movable range W1 to the second movable range W2.

As shown in FIG. 11, after the movable range is widened, the image sensor 210 moves within the widened movable range, and the subject is tracked.

In the example shown in FIG. 11, the tracking cannot be performed at timing t5. That is, the image sensor 210 reaches the end portion of the movable range, and the subsequent tracking cannot be performed.

As shown in FIG. 11, in a case where the tracking cannot be performed, the widened movable range is narrowed, and is returned to the original range. That is, the movable range is returned to the first movable range W1.

In a case where the tracking cannot be performed, since the image sensor 210 is returned to the reference position R0, after the image sensor is returned to the reference position R0, the movable range may be switched to the first movable range W1.

As described above, the movable range of the image sensor 210 is widened in a case where the focusing operation is detected, and is narrowed in a case where the tracking cannot be performed after the movable range is widened.

[Actions]

Next, an action (focusing control method) of the digital camera 1 of the present embodiment having the aforementioned configuration will be described.

<<Tracking>>

The tracking of the subject performed by moving the image sensor 210 is performed in a case where the tracking function is turned on. As described above, the function for turning on and off the tracking function can be assigned to one of the function buttons. The tracking function can be turned on and off on the menu screen.

Figure 12:
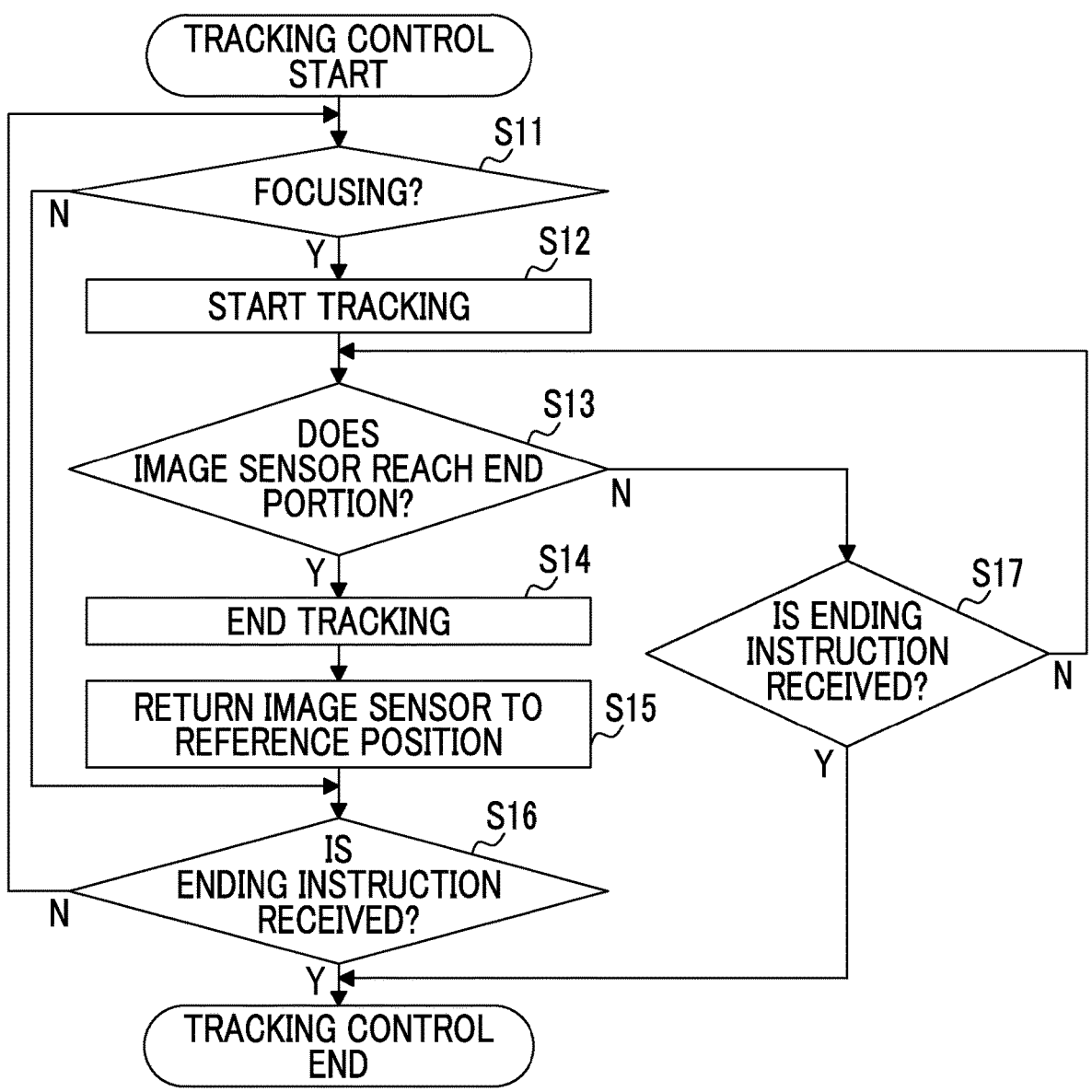

FIG. 12 is a flowchart showing a processing procedure of the tracking control in a case where the tracking function is turned on.

The photographer manually adjusts the focus by operating the focus ring 16. The tracking controller 250a determines whether the focusing is performed based on the output of the phase difference AF processor 232 (step S11).

In a case where the tracking controller 250a determines that the focusing is performed, the tracking is started (step S12). That is, the image sensor movement controller controls the movement of the image sensor 210 to maintain the focusing state based on the defocus amount detected by the phase difference AF processor 232.

The tracking control is performed within the movable range of the image sensor 210. In a case where the image sensor 210 reaches the end portion of the movable range, the tracking is ended. The tracking controller 250a determines whether or not the image sensor 210 reaches the end portion of the movable range based on the detection result of the image sensor position detector 222 (step S13).

In a case where it is determined that the image sensor 210 does not reach the end portion of the movable range, the tracking controller 250a determines whether an instruction to end the tracking is received (step S17). The ending of the tracking is instructed in a case where the tracking function is turned off. In a case where the power of the digital camera 1 is turned off, the ending is similarly instructed. In a case where the ending is instructed, the processing is ended. Unless the ending is instructed, the tracking is continued.

Meanwhile, when it is determined that the image sensor 210 reaches the end portion of the movable range, the tracking controller 250a ends the tracking (step S14). After the tracking is ended, the tracking controller 250a returns the image sensor 210 to the reference position R0 (step S15).

Thereafter, the tracking controller 250a determines whether or not the command to end the tracking is received (step S16). In a case where the ending is instructed, the processing is ended. Meanwhile, in a case where it is determined that the ending instruction is not received, the processing returns to step S11, and it is determined whether or not the focusing is performed. In a case where the focusing is performed, the tracking is resumed.

As described above, in the digital camera 1 of the present embodiment, in a case where the focusing is performed, the tracking is started, and the movement of the image sensor 210 is controlled so as to maintain the focusing state. Accordingly, the user can be properly supported and can perform the focusing with high accuracy at the time of performing manual focusing. In particular, it is possible to perform the focusing of a moving subject with high accuracy.

In a case where the tracking cannot be performed, the image sensor 210 is returned to the reference position R0. Accordingly, it is possible to improve followability at the time of resuming the tracking. At the time of returning the image sensor 210 to the reference position R0, the image sensor is returned to the reference position R0 by moving the image sensor 210 at a moving speed corresponding to the change of the defocus amount. Accordingly, the image sensor 210 can be returned to the reference position R0 without giving an uncomfortable feeling to the image.

<<Switching of Movable Range>>

Figure 13:
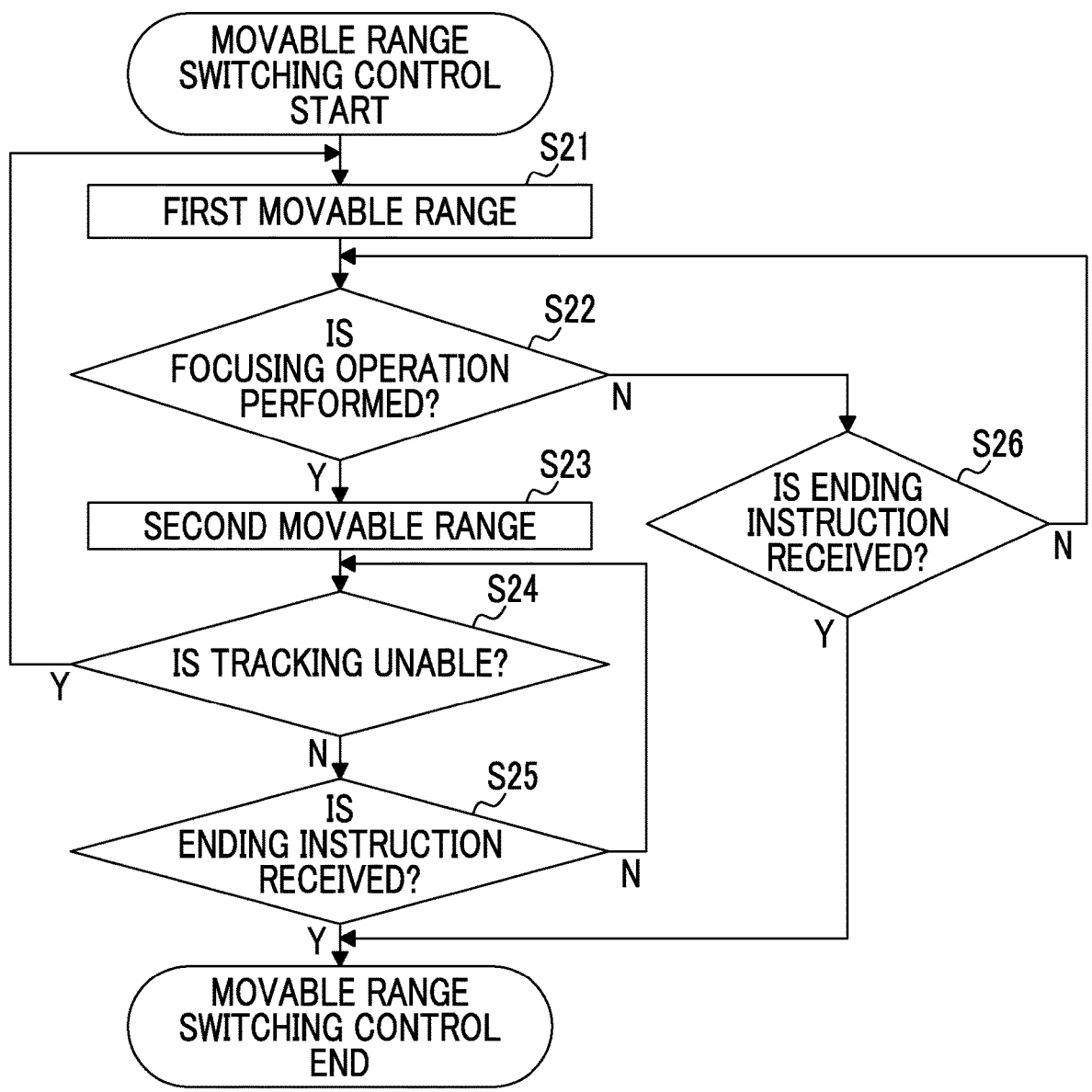
FIG. 13 is a flowchart showing a processing procedure for switching control of the movable range of the image sensor.

FIG. 13 is a flowchart showing a processing procedure for switching control of the movable range of the image sensor.

In a case where the tracking function is turned on, the movable range switch 250c sets the movable range of the image sensor 210 to the first movable range W1 (step S21).

Thereafter, the movable range switch 250c determines whether or not the focusing operation is performed based on the output of the focusing operation detector 250b (step S22). Here, the focusing operation detector 250b detects the focusing operation by detecting that the fluctuation rate of the defocus amount is equal to or less than the threshold value within the predetermined range before and after the image sensor 210.

In a case where it is determined that the focusing operation is not performed, the movable range switch 250c determines whether or not the instruction to end the tracking is received (step S26). In a case where it is determined that the ending instruction is received, the processing is ended. Meanwhile, in a case where it is determined that the ending instruction is not received, the processing returns to step S22, and it is determined again whether or not the focusing operation is performed.

In a case where it is determined in step S22 that the focusing operation is performed, the movable range switch 250c switches the movable range of the image sensor 210 from the first movable range W1 to the second movable range W2 (step S23). Accordingly, the movable range of the image sensor 210 is widened.

Thereafter, the movable range switch 250c determines whether or not the tracking cannot be performed (step S24). The tracking of the subject is performed within the movable range of the image sensor 210. In a case where the image sensor 210 moves to the end portion of the movable range, the subsequent tracking cannot be performed. The movable range switch 250c determines whether the image sensor 210 reaches the end portion of the movable range based on the detection result of the image sensor position detector 222. It is determined that the tracking cannot be performed in a case where it is determined that the image sensor 210 reaches the end portion of the movable range.

In a case where it is determined in step S24 that the tracking can be performed, the movable range switch 250c determines whether the instruction to end the tracking is received (step S25). In a case where it is determined that the ending instruction is received, the processing is ended. Meanwhile, in a case where it is determined that the ending instruction is not received, the processing returns to step S24, and it is determined again whether or not the tracking cannot be performed.

In a case where it is determined in step S24 that the tracking cannot be performed, the movable range switch 250c switches the movable range of the image sensor 210 from the second movable range W2 to the first movable range W1 (step S21). Accordingly, the movable range of the image sensor 210 is narrowed. Thereafter, it is determined whether or not the focusing operation is performed again (step S22). In a case where the focusing operation is detected, the movable range of the image sensor 210 is switched from the first movable range W1 to the second movable range W2.

As stated above, in the digital camera 1 of the present embodiment, in a case where the focusing operation is performed, the movable range of the image sensor 210 is automatically widened. The case where the focusing operation is performed is a case where the photographer tries to focus on the subject. Accordingly, in this case, the focusing operation performed by the photographer can be appropriately supported by widening the movable range of the image sensor 210 to widen the trackable range. Meanwhile, even though the photographer operates the interchangeable lens 10, in a case where this operation is not an operation for focusing on the subject, the movable range is not changed, and is maintained constant. In a case where the focusing operation is not performed and the trackable range is widened by widening the movable range of the image sensor 210, a result does not match the intention of the photographer. That is, for example, in a case where the photographer operates the interchangeable lens 10 in order to confirm a blurriness state and the subject is tracked over a wide range, the blurriness state which is an original target cannot be confirmed. Therefore, in a case where the operation is not the focusing operation, the operation matching the intention of the photographer can be performed by maintaining the movable range with no change.

Modification Examples

<<Modification Example of Switching of Movable Range>>

<Other Examples of Condition for Narrowing Movable Range>

In the aforementioned embodiment, in a case where the movable range of the image sensor 210 is widened and the tracking of the subject cannot be performed, the movable range is narrowed and returned to the original movable range (first movable range). In the case where the movable range of the image sensor 210 is widened, an aspect in which the movable range is narrowed and returned to the original movable range is not limited thereto. In a case where the position of the image formation point of the subject is separated from the movable range of the image sensor 210 by a predetermined distance or more, the movable range may be narrowed and returned to the original movable range.

Figure 14:
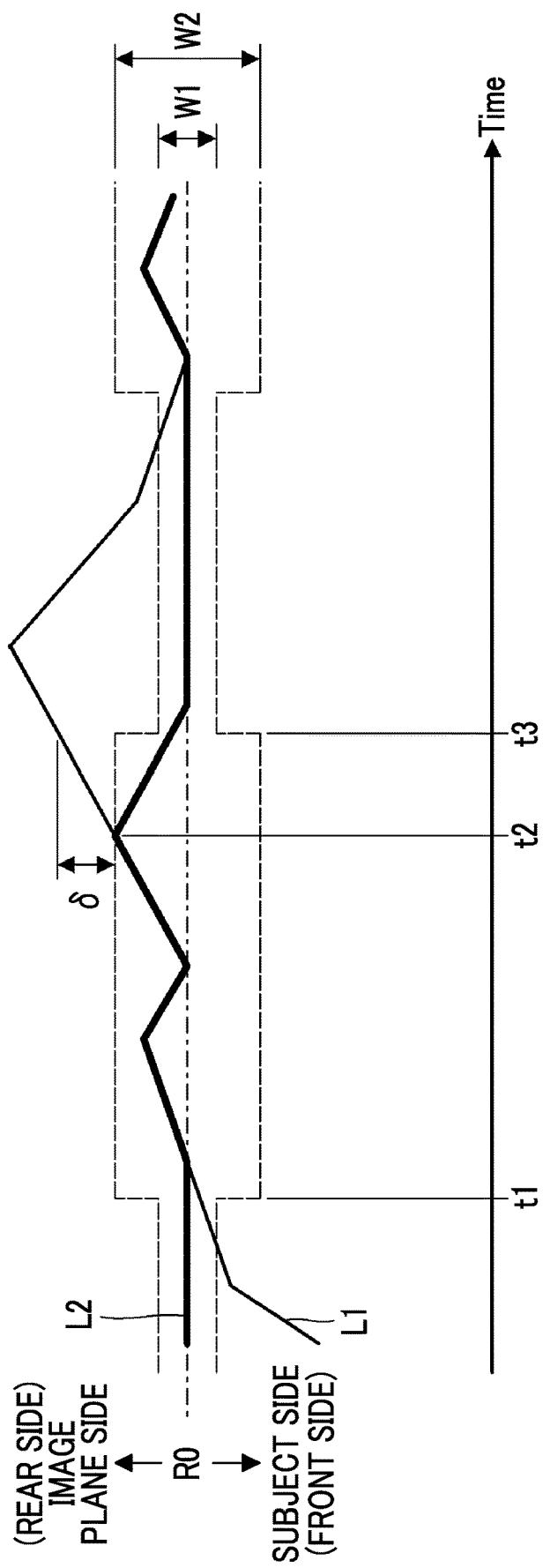
FIG. 14 is a conceptual diagram showing a processing procedure in a sequence of time in a case where the position of the image formation point is separated from the movable range by the predetermined distance or more and the movable range is switched.

FIG. 14 is a conceptual diagram showing a processing procedure in a sequence of time in a case where the position of the image formation point is separated from the movable range by the predetermined distance or more and the movable range is switched.

In this diagram, a reference L1 denotes a movement locus of the image formation point, and a reference L2 denotes a movement locus of the image sensor 210. A reference W1 denotes the first movable range, and a reference W2 denotes the second movable range.

In the example shown in this diagram, the focusing operation is detected at timing t1, and the movable range is switched from the first movable range W1 to the second movable range W2.

Thereafter, at timing t2, the image sensor 210 reaches the end portion of the movable range (second movable range W2), and the tracking cannot be performed. In the present aspect, even though the tracking cannot be performed, the movable range is not immediately narrowed, but is narrowed in a case where the position of the image formation point is separated from the movable range by the predetermined distance or more. Specifically, in a case where the position of the image formation point is separated from the end portion of the movable range by a distance δ, the movable range is narrowed. In the example shown in FIG. 14, at timing t3, the position of the image formation point is separated from the end portion of the movable range by a distance δ. Thus, the movable range is narrowed at timing t3.

As stated above, in a case where the position of the image formation point of the subject is separated from the movable range of the image sensor 210 by the predetermined distance or more, the movable range may be narrowed and returned to the original movable range. The distance δ can be appropriately set according to the control aspect of the tracking.

<Example of Maintaining Widened State in Case where Movable Range is Widened>

Although it has been described in the aforementioned embodiment that in a case where the movable range is widened, the movable range is returned to the original range under a predetermined condition, the widened state may be maintained according to the intention of the photographer. For example, a tracking range widening mode is prepared as a tracking operation mode. In a case where this mode is selected, the movable range switch 250c stops the subsequent switching operation in a case where the movable range of the image sensor 210 is widened once.

Figure 15:
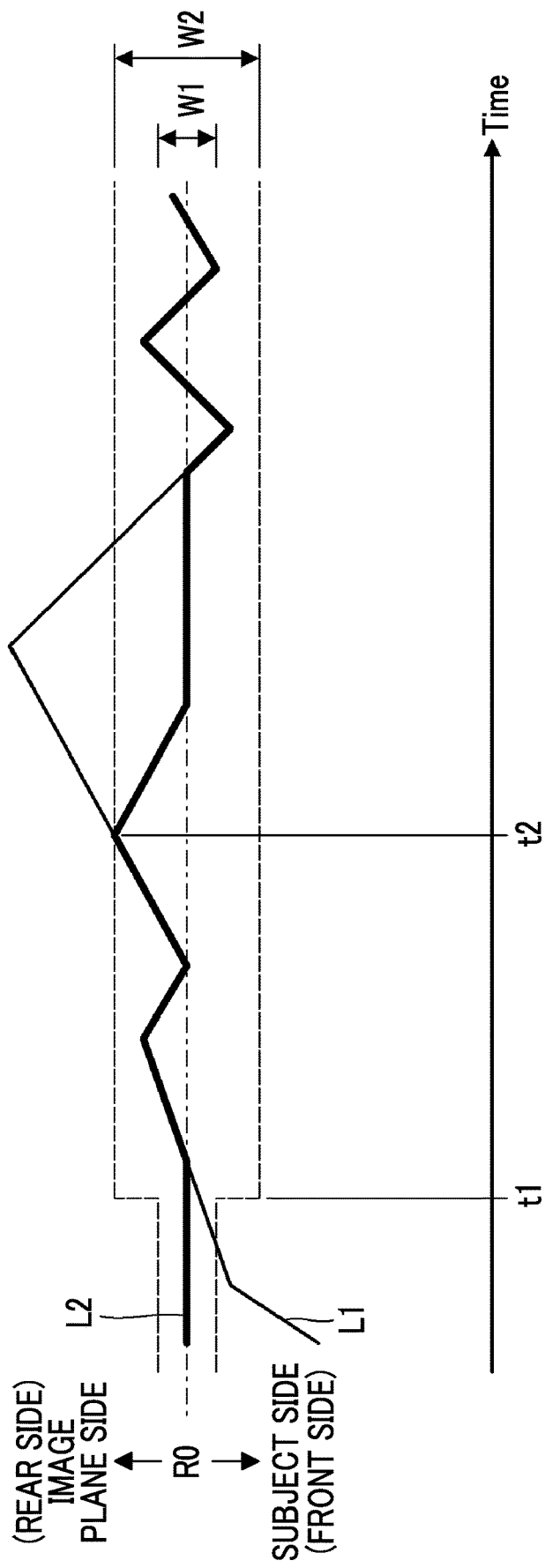
FIG. 15 is a conceptual diagram showing a processing procedure in a sequence of time in a case where a tracking range widening mode is selected.

FIG. 15 is a conceptual diagram showing a processing procedure in a sequence of time in a case where the tracking range widening mode is selected.

For example, a function of turning on and off the tracking range widening mode can be assigned to one of the function buttons. In this case, the function button to which this function is assigned functions as a mode switch. The turned-on and turned-off of the tracking range widening mode can be set on the menu screen.

In the example shown in this diagram, the focusing operation is detected at timing t1, and the movable range is switched from the first movable range W1 to the second movable range W2.

Thereafter, at timing t2, the image sensor 210 reaches the end portion of the movable range (second movable range W2), and the tracking cannot be performed. In the present aspect, even though the tracking cannot be performed, the movable range is not narrowed, and the widened state is maintained.

Thus, in a case where the tracking range widening mode is turned on, the subsequent switching operation is stopped in a case where the movable range is widened. That is, in a case where the movable range of the image sensor 210 is widened once, the widened state is continuously maintained. Accordingly, the intention of the photographer can be appropriately reflected on the control.

<<Modification Example of Movable Range>>

The movable range of the image sensor 210 before the movable range is widened may be zero. In this case, in a case where the focusing operation is detected, the movable range is set.

Figure 16:
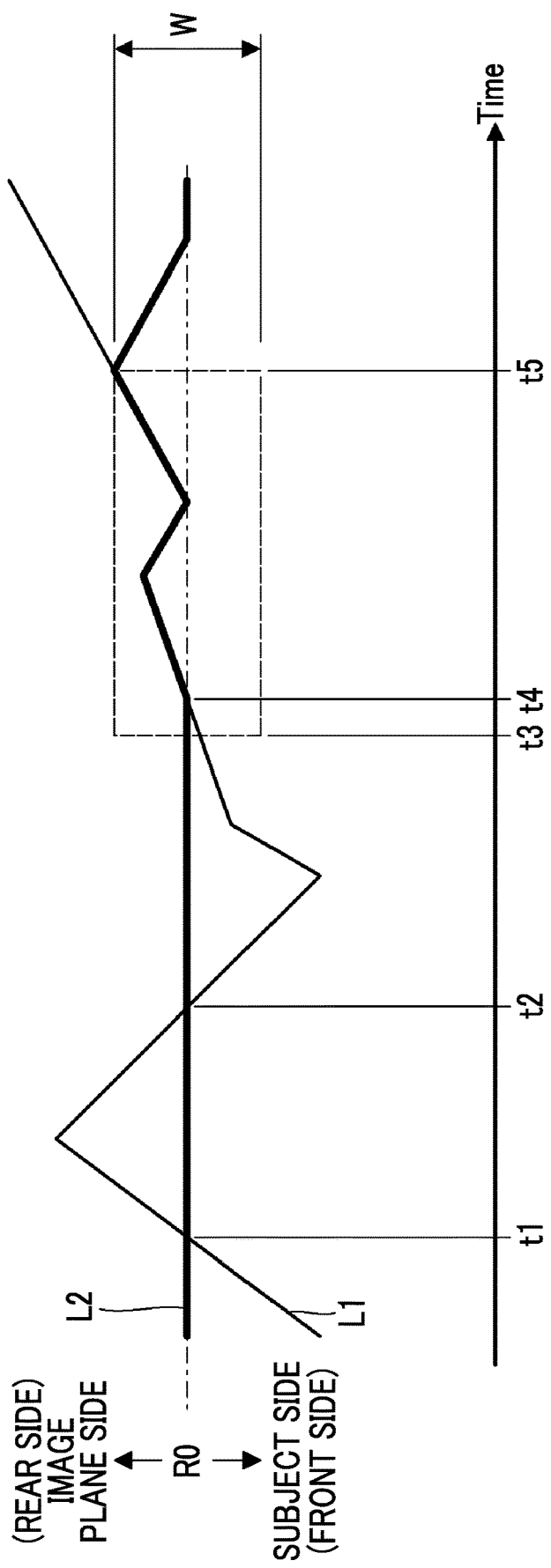
FIG. 16 is a conceptual diagram showing a processing procedure of switching in a sequence of time in a case where a movable range is set only in a state in which a focusing operation is detected.

FIG. 16 is a conceptual diagram showing a processing procedure of switching in a sequence of time in a case where the movable range is set only in a state in which the focusing operation is detected.

In this diagram, a reference L1 denotes a movement locus of the image formation point, and a reference L2 denotes a movement locus of the image sensor 210. The movable range switches between zero and W.

In the example shown in FIG. 16, the subject is focused at timings t1, t2, and t4.

In the first and second focusing (focusing at timings t1 and t2), since the focusing operation is not detected, the movable range of the image sensor 210 is maintained at zero.

In the third focusing (focusing at timing t4), since the focusing operation is detected, the movable range is switched from zero to W at timing t3. That is, the movable range is widened.

As shown in FIG. 16, after the movable range is widened, the image sensor 210 moves within the widened movable range, and the subject is tracked.

In the example shown in FIG. 16, the tracking cannot be performed at timing t5. In a case where the tracking cannot be performed, the widened movable range is narrowed and returned to the original range. That is, the movable range is returned to zero.

In a case where the tracking cannot be performed, since the image sensor 210 is returned to the reference position R0, the movable range may be switched to zero after the image sensor is returned to the reference position R0.

As stated above, in a case where the focusing operation is detected, the movable range may be set, and the tracking may be performed. Zero in the present example includes a range that can be regarded as substantially zero.

<<Modification Example of Tracking Control>>

In the digital camera of the aforementioned embodiment, in a case where the image sensor 210 reaches the end portion of the movable range W, the tracking is ended, and the image sensor 210 is returned to the reference position R0. An aspect of the tracking control is not limited thereto. For example, in a case where the image sensor 210 reaches the end portion of the movable range W, the tracking may be ended, and the image sensor 210 may stand by at the position of the end portion until the focusing is performed again. In this case, in a case where the focusing is performed again during standby, the tracking is resumed.

Figure 17:
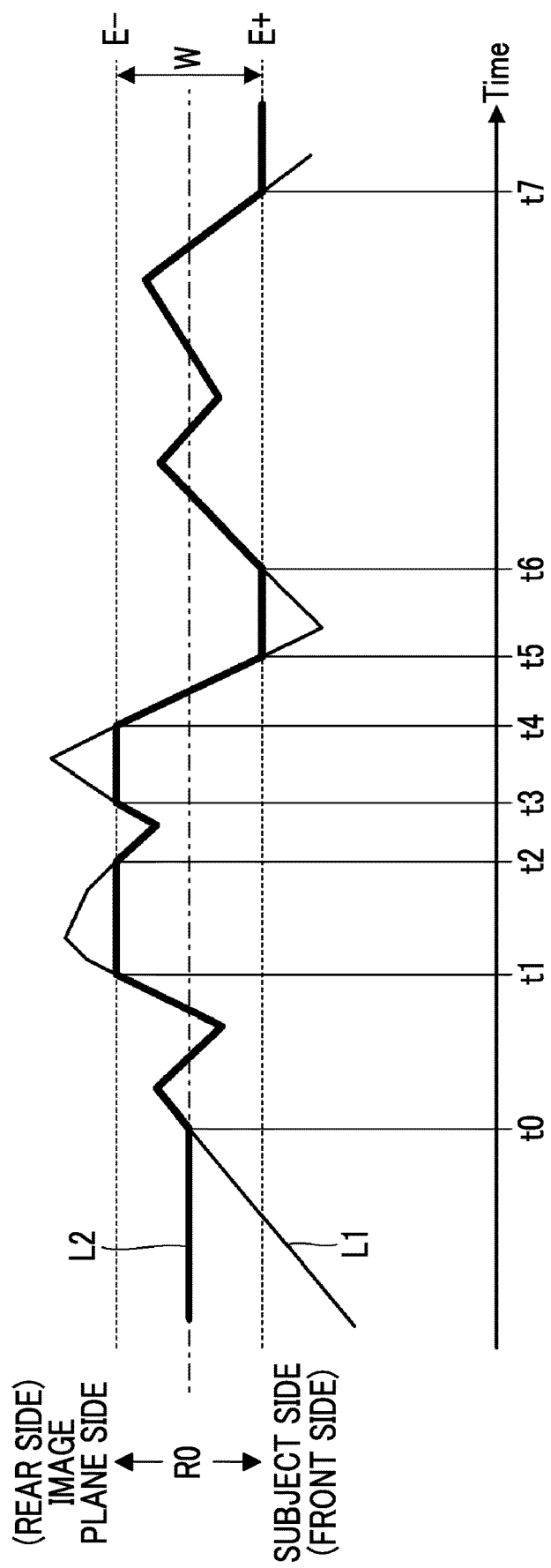
FIG. 17 is a conceptual diagram of tracking control over time in the digital camera.

FIG. 17 is a conceptual diagram of the tracking control over time in the digital camera of the present embodiment. Here, a case where the movable range of the image sensor 210 is constant will be described as an example for the sake of simplification in description.

In this diagram, a reference L1 denotes a movement locus of the image formation point, and a reference L2 denotes a movement locus of the image sensor 210.

As shown in this diagram, in a case where the focusing is performed, the tracking is started. That is, the tracking is started in a case where the image formation point is located on the imaging surface of the image sensor 210 located at the reference position R0.

In the example shown in FIG. 17, the focusing is performed for the first time at timing t0. Therefore, the tracking is started from timing t0. As shown in FIG. 17, the movement of the image sensor 210 is started after the focusing is performed at timing t0. The image sensor 210 moves following the movement of the image formation point. Accordingly, the focusing state is maintained.

The image sensor 210 moves within the movable range. The example shown in FIG. 17 shows a case where the image sensor 210 reaches one end portion E− of the movable range W at timing t1 after the focusing is performed at timing t0. In this case, the tracking is temporarily ended. In a case where the tracking is ended, the image sensor 210 is stopped at a position of the end portion E−, and stands by until the focusing is performed again.

In the example shown in FIG. 17, a case where the focusing is performed again at timing t2 is shown. In this case, the tracking is resumed from timing t2. In the example shown in FIG. 17, the image sensor 210 reaches one end portion E− of the movable range W at timing t3, and after the focusing is performed again at timing t4, the image sensor 210 reaches to the other end portion E+ of the movable range W at timing t5. A case where the image sensor 210 reaches the other end portion E+ of the movable range W at timing t7 after the focusing is performed again at timing t6 is shown. As shown in this diagram, the tracking is ended whenever the image sensor 210 reaches the end portion of the movable range W. In a case where the tracking is ended, the image sensor 210 is stopped at the position of the end portion, and stands by until the focusing is performed again. IN a case where the focusing is performed again, the tracking is resumed.

As described above, in a case where the focusing is performed, the tracking controller 250a starts the tracking, moves the image sensor 210 within the movable range, and maintains the focusing state. Meanwhile, in a case where the image sensor 210 reaches the end portion of the movable range W, the tracking is ended, and the image sensor stands by at the position of the end portion until the focusing is performed again.

Figure 18:
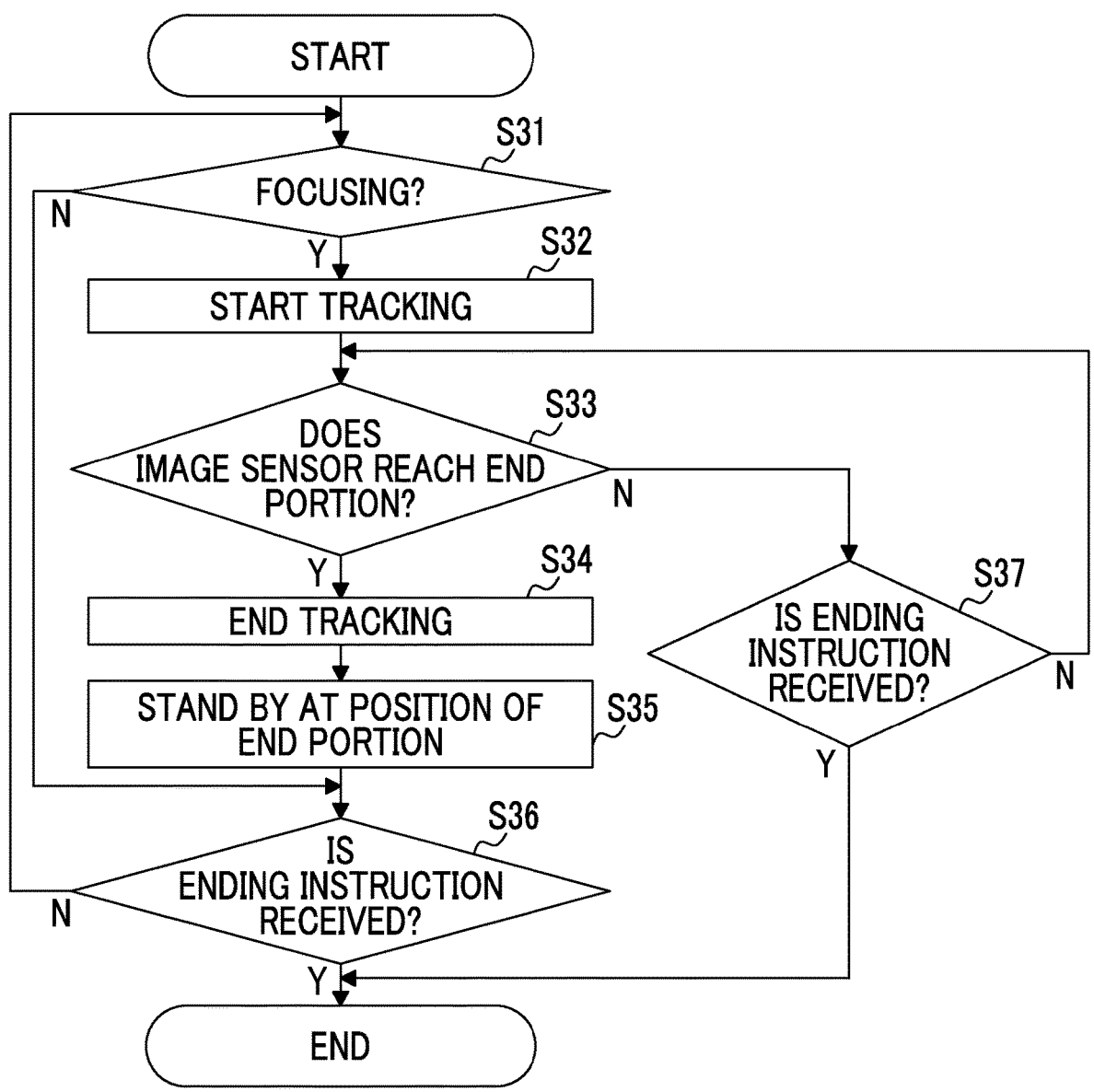
FIG. 18 is a flowchart showing a processing procedure of the tracking control.

FIG. 18 is a flowchart showing a processing procedure of the tracking control.

The photographer manually adjusts the focus by operating the focus ring 16. The tracking controller 250a determines whether the focusing is performed based on the output of the phase difference AF processor 232 (step S31).

In a case where the tracking controller 250a determines that the focusing is performed, the tracking is started (step S32). That is, the image sensor movement controller controls the movement of the image sensor 210 to maintain the focusing state based on the defocus amount detected by the phase difference AF processor 232.

The tracking is performed within the movable range of the image sensor 210. In a case where the image sensor 210 reaches the end portion of the movable range, the tracking is ended. The tracking controller 250a determines whether or not the image sensor 210 reaches the end portion of the movable range (step S33).

In a case where it is determined that the image sensor 210 does not reach the end portion of the movable range, the tracking controller 250a determines whether an instruction to end the tracking is received (step S37). In a case where the ending is instructed, the processing is ended. Unless the ending is instructed, the tracking is continued.

Meanwhile, when it is determined that the image sensor 210 reaches the end portion of the movable range, the tracking controller 250a ends the tracking (step S34). After the tracking is ended, the tracking controller 250a causes the image sensor 210 to stand by at the position of the end portion (step S35).

Thereafter, the tracking controller 250a determines whether or not the instruction to end the tracking is received (step S36). In a case where the ending is instructed, the processing is ended. Meanwhile, in a case where it is determined that the ending instruction is received, the processing returns to step S31, and it is determined whether or not the focusing is performed. In a case where the focusing is performed, the tracking is resumed.

As described above, in the digital camera 1 of the present embodiment, in a case where the focusing is performed, the tracking is started, and the movement of the image sensor 210 is controlled so as to maintain the focusing state. Accordingly, the user can be properly supported and can perform the focusing with high accuracy at the time of performing manual focusing. In particular, the focusing of the moving subject can be performed with high accuracy.

In a case where the tracking cannot be performed, the image sensor 210 is stopped and, and stands by at the position of the end portion of the movable range W. Accordingly, it is possible to easily recover the focusing state. That is, since a distance to return to the focusing state can be shortened, the focusing state can be quickly recovered.

Although it has been described in the aforementioned example that the movable range of the image sensor 210 is constant for the sake of simplification in description, in a case where the tracking cannot be performed in a state in which the movable range is widened, the image sensor 210 is returned to the reference position. Alternatively, the image sensor stands by at the position of the end portion of the narrowed movable range.

Meanwhile, in a state in which the tracking range widening mode is provided as the tracking operation mode, in a case where the tracking range widening mode is turned on, it is preferable that the image sensor stands by at the position of the end portion of the movable range. Accordingly, since a distance to return to the focusing state can be shortened, the focusing state can be quickly recovered.

Figure 19:
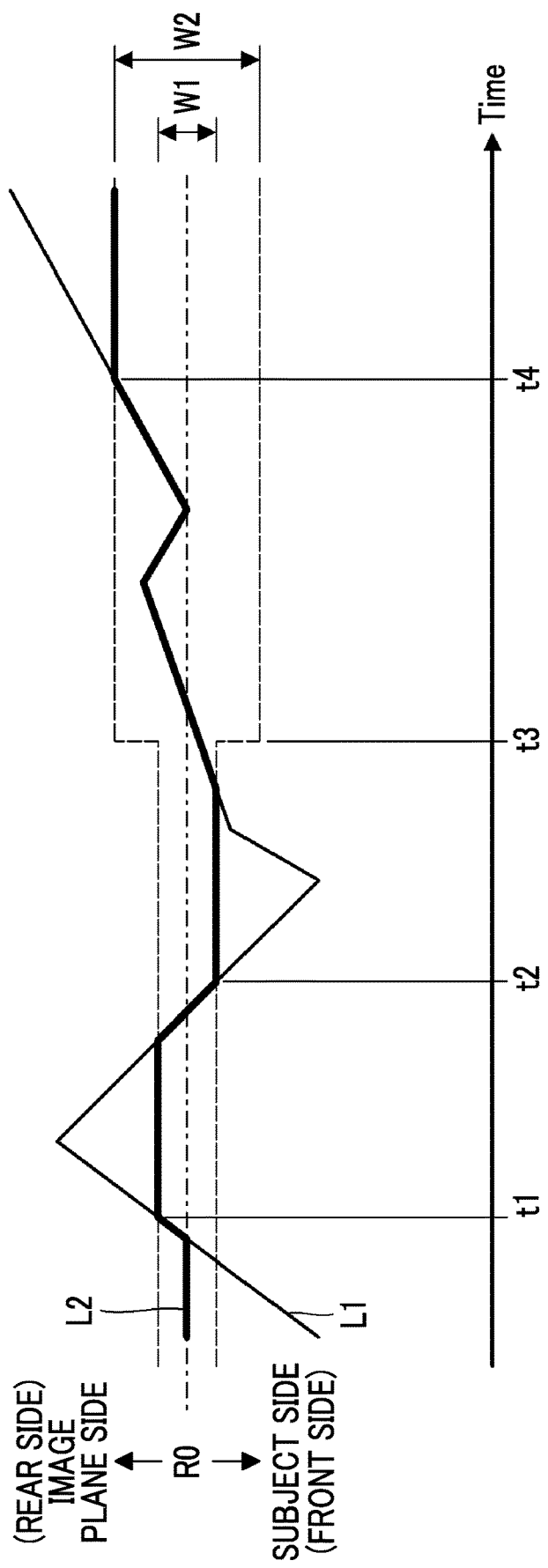
FIG. 19 is a conceptual diagram showing a processing procedure in a sequence of time in a case where the tracking range widening mode is selected.

FIG. 19 is a conceptual diagram showing a processing procedure in a sequence of time in a case where the tracking range widening mode is selected.

In the example shown in this diagram, the focusing operation is detected at timing t3, and the movable range is switched from the first movable range W1 to the second movable range W2. Thereafter, at timing t4, the image sensor 210 reaches the end portion of the movable range (second movable range W2), and the tracking cannot be performed. However, since the tracking range widening mode is turned on, the movable range is not narrowed, and the widened state is maintained.

In the example shown in FIG. 19, the image sensor 210 reaches the end portion of the movable range at timings t1, t2, and t4, and the tracking cannot be performed. In a case where the image sensor 210 reaches the position of the end portion of the movable range, the image sensor stops and stands by at this position. Accordingly, the image sensor can be early returned to the focusing state.

<<Modification Example of Condition for Starting Tracking>>

<Example of Starting Tracking in a Case where it is Recognized that Focusing is Almost Performed>

Although it has been described in the aforementioned embodiment that the tracking is started in a case where the subject is focused, the condition for starting the tracking is not limited thereto. For example, the tracking may be started even in a state in which it is recognized that the focusing is almost performed. The state in which it is recognized that the focusing is almost performed is, for example, a case where the defocus amount is continuously equal to or less than a threshold value for a predetermined time. That is, the state in which it is recognized that the focusing is almost performed is a case where a state in which the focusing is almost performed is continuously maintained for a predetermined time. In such a case, the tracking may be started by considering that the focusing is performed.

In a state in which the focus is adjusted by using the main monitor 104 or the electronic viewfinder 108, in a case where and the resolution of the main monitor 104 and the electronic viewfinder 108 is low, it is difficult to accurately perform the focusing.

Therefore, in a case where the defocus amount to be detected is continuously equal to or less than the threshold value for the predetermined time, the tracking is started by considering that the focusing is performed. In a case where the defocus amount is continuously equal to or less than the threshold value for the predetermined time, since it is recognized that the state is almost substantially close to the focusing, the tracking is started by considering that the focusing is performed in this case.

Figure 20:
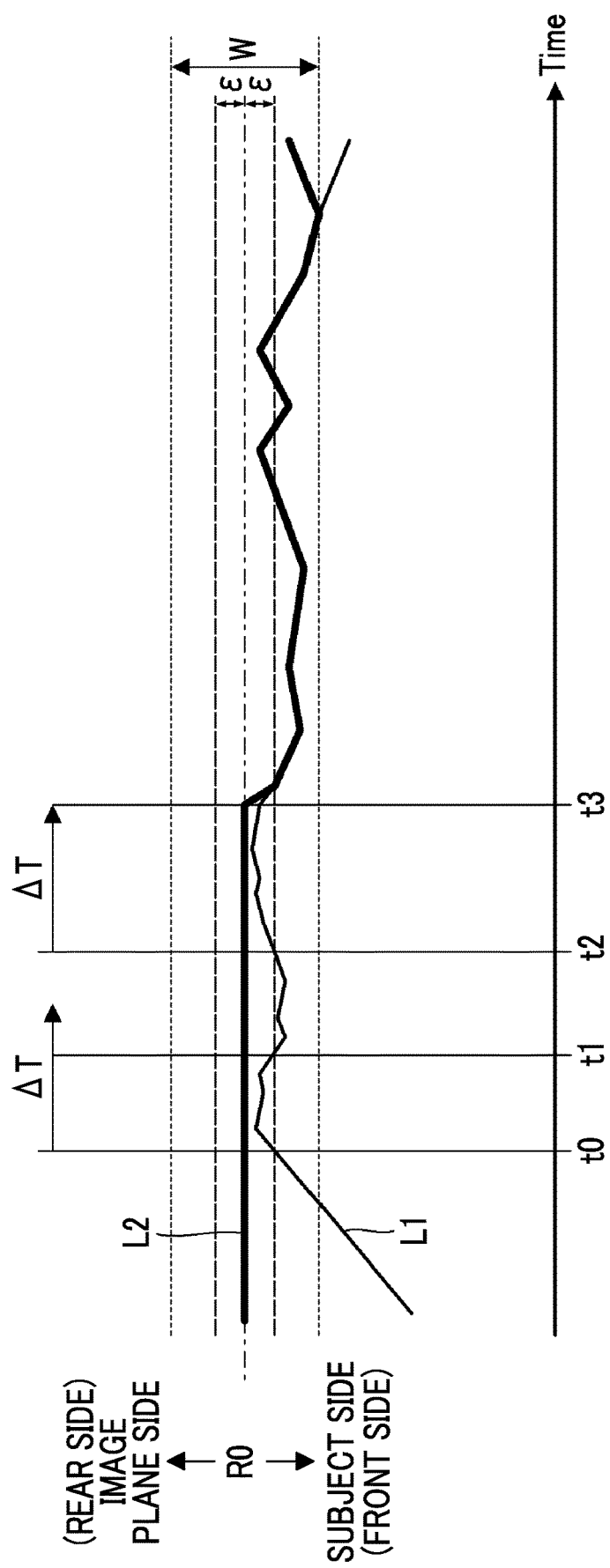
FIG. 20 is a conceptual diagram of processing over time in a case where tracking is performed by considering that focusing is performed in a case where a defocus amount is continuously equal to or less than a threshold value for a predetermined time.

FIG. 20 is a conceptual diagram of processing over time in a case where the tracking is performed by considering that the focusing is performed in a case where the defocus amount is continuously equal to or less than the threshold value for the predetermined time. Here, a case where the movable range of the image sensor 210 is constant will be described as an example for the sake of simplification in description.

In this diagram, a reference L1 denotes a movement locus of the image formation point, and a reference L2 denotes a movement locus of the image sensor 210.

A threshold value of the defocus amount is E. The tracking is started by considering that the focusing is performed in a case where a state in which the defocus amount is equal to or less than the threshold value ε is continued for time δT.

In the example shown in FIG. 20, the defocus amount is initially equal to or less than the threshold value ε at timing t0. However, the defocus amount exceeds the threshold value c at timing t1 before time δT elapses. Thus, even though the defocus amount is equal to or less than the threshold value c, it is not considered that the focusing is performed.

In the example shown in FIG. 20, the defocus amount is equal to or less than the threshold value ε again at timing t2. After timing t2, the defocus amount is continuously equal to or less than the threshold value ε. Thus, the tracking is started at timing t3 at which time δT elapses.

In a case where the tracking is started, the image sensor 210 moves toward the image formation point, and the focusing is performed. After the focusing is performed, the image sensor 210 moves within the movable range, and the focusing state is maintained.

In this manner, the tracking is started by considering that the focusing is performed in a case where the defocus amount is continuously equal to or less than the threshold value for the predetermined time. Accordingly, it is possible to improve convenience. In particular, in a case where the focus is adjusted by using the main monitor 104 or the electronic viewfinder 108 having a low resolution (resolution), it may be difficult to accurately perform the focusing. Even in such a case, in a case where the focusing is performed in the vicinity of the focusing, since the tracking is performed, the intention of the photographer can be appropriately reflected on the control.

In addition to the aforementioned conditions, the tracking may be started by considering that the focusing is performed in a case where the amount of change of the defocus amount is continuously equal to or less than a threshold value for a predetermined time. That is, in a case where the defocus amount is continuously equal to or less than the first threshold value for the predetermined time and the amount of change of the defocus amount is continuously equal to or less than the second threshold value for the predetermined time, the tracking is started by considering that the focusing is performed. The state in which the defocus amount is continuously equal to or less than the predetermined value (equal to or less than the first threshold value) for the predetermined time and the amount of change of the defocus amount is continuously equal to or less than the predetermined value (equal to or less than the second threshold value) for the predetermined time is a state in which the focus lens is almost not changed in the vicinity of the focusing. That is, the focus adjustment is almost not performed in the vicinity of the focusing. In this case, the tracking is started by considering that the focusing is performed. Accordingly, the tracking can be started from a state almost substantially close to the focusing. Accordingly, it is possible to improve convenience.

The function may be turned on and off by the user. That is, a function of turning on and off the function considered as the focusing by the user may be provided. For example, the turning on and off of the function are set on the menu screen.

<Example of Starting Tracking in Case Focusing Operation is Detected>

The tracking may be started in a case where the focusing operation is detected. In this case, in a case where the movable range of the image sensor 210 is widened, the tracking is simultaneously started (including almost simultaneously).

Figure 21:
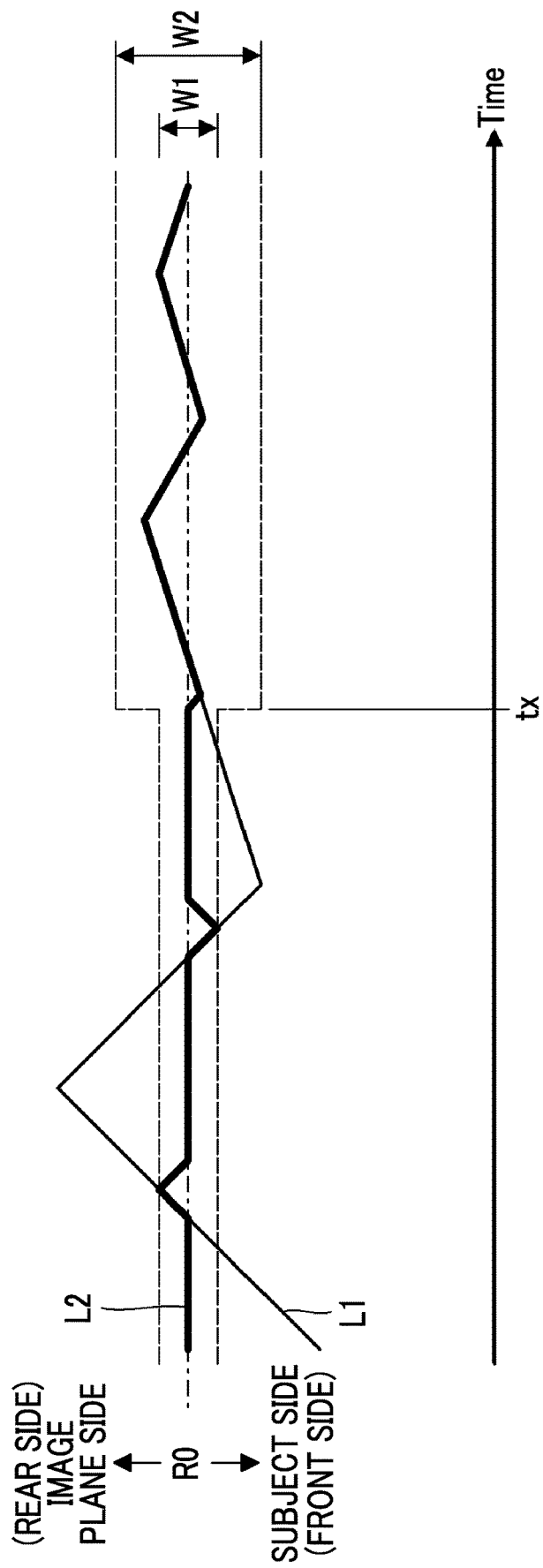
FIG. 21 is a conceptual diagram of processing over time in a case where the focusing operation is performed and the tracking is started.

FIG. 21 is a conceptual diagram of processing over time in a case where the tracking is started in a state in which the focusing operation is performed.

In this diagram, a reference L1 denotes a movement locus of the image formation point, and a reference L2 denotes a movement locus of the image sensor 210.

FIG. 21 shows an example in which the focusing operation is detected at timing tx. As shown in this diagram, in a case where the focusing operation is detected in a state in which the movable range is narrowed, the movable range is widened. At the same time, the tracking is started. In this case, since the tracking is started before the focusing is performed, the image sensor 210 moves toward the image formation point. That is, the image sensor 210 moves so as to early focus. After the focusing is performed, the image sensor 210 moves within the movable range so as to follow the image formation point, and the focusing state is maintained.

As stated above, the focusing can be early performed by starting the tracking in a case where the focusing operation is detected. Since the tracking is started in conjunction with the focusing operation, control according to the intention of the photographer can be performed.

<<Example of Automatically Turning on and Off Tracking Function>>

Although it has been described in the aforementioned embodiment that the tracking function is manually switched between the turned-on and turned-off, the tracking function may be automatically switched. For example, the tracking function may be automatically turned on in a case where a manual focus is selected. In a case where the camera main body 100 cannot communicate with the interchangeable lens 10, the tracking function may be automatically turned on. The case where the camera main body 100 cannot communicate with the interchangeable lens 10 is a case where the camera controller 250 cannot communicate with the lens controller 30, and corresponds to a case where the lens controller 30 is not provided in the interchangeable lens 10. In a case where the camera main body 100 cannot communicate with the interchangeable lens 10, the focusing is usually performed manually. Therefore, the control can be realized according to the intention of the photographer by automatically turning on the tracking function in such a case.

<<Movable Range of Image Sensor>>

The movable range of the image sensor 210 is optionally set within a mechanical operation range of the image sensor movement driver 220. For example, in a case where the image sensor movement driver 220 is a piezo actuator, the movable range of the image sensor 210 is optionally set within the mechanical operation range of the piezo actuator. As the movable range becomes wider, an operation range of the AF becomes wider.

As in the digital camera of the aforementioned embodiment, in a case where the focus is adjusted by using the main monitor 104 or the electronic viewfinder 108, it is preferable that the widened movable range (second movable range) is set with consideration for the resolution of the main monitor 104 and the electronic viewfinder 108. In a case where the resolution of the main monitor 104 and the electronic viewfinder 108 is lower than the resolution of the image sensor 210, the accuracy capable of being adjusted on the main monitor 104 and the electronic viewfinder 108 is limited. Therefore, it is preferable that the movable range is set such that the range that cannot be adjusted can be covered by the movement of the image sensor 210 in the main monitor 104 and the electronic viewfinder 108. Specifically, it is preferable that the movable range equal to or greater than a pixel pitch of the main monitor 104 and the electronic viewfinder 108 is secured. Accordingly, even though the focus is adjusted by using the main monitor 104 or the electronic viewfinder 108 having a low resolution, the target subject can be focused with high accuracy.

<<Reference Position of Image Sensor>>

Although it has been described in the aforementioned embodiment that the reference position of the image sensor 210 is set at the center of the movable range, the position set as the reference position is not limited thereto. For example, the reference position may be set at a position on the subject side (front side) from the center of the movable range, or the reference position may be set at a position on the image plane side (rear side). The user can set any position. As described above, followability can be improved by setting the reference position at the center of the movable range.

Although it has been described in the aforementioned embodiment that the reference position is set at the position of the flange back, the reference position may be set at a position different from the flange back. As described above, it is possible to maximize the optical performance of the interchangeable lens 10 at the time of performing the focusing at the reference position by setting the reference position at the flange back position.

The reference position may be variable. For example, the reference position can be appropriately switched while referring to the positional information of the image sensor 210 at the time of focusing on the past subject. The reference position can be appropriately switched according to the subject. For example, the reference position can be appropriately switched according to the moving direction of the subject. For example, for the subject that moves in one direction, the reference position is set in a direction opposite to a moving direction of an image formation point.

<<Focus Detector>>

Although it has been described in the aforementioned embodiment that the defocus amount is detected based on the output of the phase difference detection pixel 218 formed on the imaging surface 212 of the image sensor 210, means for detecting the defocus amount is not limited thereto. Known focus detection means such as a passive method or an active method can be employed.

Although it has been described in the aforementioned embodiment that the phase difference detection pixels are arranged at regular intervals along the x direction, the phase difference detection pixels may be arranged at regular intervals along the y direction. The phase difference detection pixels may be arranged at regular intervals along the x direction and the y direction.

Although it has been described in the aforementioned embodiment that the phase difference detection pixels are arranged only in the AF area set at the center of the screen, an area where the phase difference detection pixels are arranged is not limited thereto. The phase difference detection pixels may be arranged on the whole screen.

<<Image Sensor Movement Driver>>

Although it has been described in the aforementioned embodiment that the image sensor 210 is moved along the optical axis L by using the piezo actuator, the configuration of the image sensor movement driver is not limited thereto. The image sensor 210 can be moved along the optical axis L by employing a known linear-motion-type drive mechanism such as a linear motor or a leadscrew mechanism.

<<Imaging Unit>>

Although it has been described in the aforementioned embodiment that the present invention is applied to a single-sensor digital camera has been described as an example, the present invention can also be applied to a multi-sensor camera.

FIG. 22 is a diagram showing an example in a case where the present invention is applied to a three-sensor digital camera.

As shown in this diagram, the three-sensor digital camera includes a color separation prism 310 and three image sensors 210R, 210G, and 210B in the imaging unit.

The color separation prism 310 separates light incident on an incident surface 310a into light rays of three colors of red (R) light, green (G) light, and blue (B) light. The separated light rays of the three colors are emitted from an R light exit surface 310r, a G light exit surface 310g, and a B light exit surface 310b, respectively.

The three image sensors include an image sensor 210R that receives R light, an image sensor 210G that receives G light, and an image sensor 210B that receives B light.

The image sensor 210R that receives the R light is disposed so as to face the R light exit surface 310r, and receives the R light emitted from the R light exit surface 310r.

The image sensor 210G that receives the G light is disposed so as to face the G light exit surface 310g, and receives the G light emitted from the G light exit surface 310g.

The image sensor 210B that receives the B light is disposed so as to face the B light exit surface 310b, and receives the B light emitted from the B light exit surface 310b.

The three image sensors 210R, 210G, and 210B are arranged at positions at which optical path lengths from the incident surface 310a of the color separation prism 310 are identical.

The three image sensors 210R, 210G, and 210B are integrally attached to the color separation prism 310 via a holder (not shown). A unit in which the image sensors 210R, 210G, and 210B are integrally attached to the color separation prism 310 is referred to as an imaging unit 330. An image sensor movement driver 220x moves the imaging unit 330 back and forth along the optical axis L. An image sensor position detector 222x detects a position of the imaging unit 330 relative to the reference position.

<<Imaging Lens>>

Although it has been described in the aforementioned embodiment that the focus is adjusted by moving the focus lens back and forth along the optical axis, a focus adjustment mechanism of the imaging lens is not limited thereto. A liquid lens or a liquid crystal lens can be used as the focus lens. In the liquid lens and the liquid crystal lens, the focus is adjusted by using a change in refractive index.

Although it has been described in the aforementioned embodiment that the focus lens is driven by the actuator such as a linear motor, the focus lens may be manually moved by using a cam mechanism or a helicoid gear.

<<Imaging Device>>

Although it has been described in the aforementioned embodiment that the present invention is applied to the digital camera, the application of the present invention is not limited thereto. For example, the present invention can be applied to a video camera, a television camera, and a cinema camera, and can be similarly applied to electronic devices (for example, a mobile phone, a smartphone, a tablet personal computer, and a laptop personal computer) having an imaging function.

In the above-described embodiment, the case where the present invention is applied to an interchangeable lens type digital camera has been described as an example. However, the present invention can be similarly applied to a camera in which an imaging lens is integrated in a camera main body.

<<Others>>

Although it has been described in the aforementioned embodiment that each of the tracking controller includes the microcomputer, the hardware configuration for realizing the functions is not limited thereto. These functions can be realized by various processors. A CPU which is a general-purpose processor functioning as a processing unit that performs various processing by executing software (program) and a dedicated electric circuit which is a processor having a circuit configuration designed as a dedicated circuit in order to perform specific processing such as programmable logic device (PLD) and application specific integrated circuit (ASIC) of which a circuit configuration can be changed after field-programmable gate array (FPGA) is manufactured are included in the various processors.

One processing unit may be constituted by one of these various processors, or may be constituted by two or more processors of the same type or different types. For example, one processing unit may be constituted by a plurality of FPGAs or a combination of a CPU and FPGA.

A plurality of processing units may be constituted by a single processor. As an example in which the plurality of processing units is constituted by one processor, there is a first example in which one processor is constituted by a combination of one or more CPUs and software or one processor functions as the plurality of processing units as represented by a computer such as a client or server. There is a second example in which as represented by system on chip (SoC), a processor that realizes the functions of the entire system including the plurality of processing units by a single integrated circuit (IC) chip is used. As described above, the various processing units are constituted by using one or more of the various processors as a hardware structure.

The hardware structures of these various processors are more specifically electric circuits in which circuit elements such as semiconductor elements are combined.

EXPLANATION OF REFERENCES

1: digital camera
10: interchangeable lens
12: lens barrel
14: lens operator
16: focus ring
18: stop ring
20: focus lens
22: focus lens driver
24: focus lens position detector
26: stop
28: stop driver
30: lens controller
30a: focus lens drive controller
30b: stop drive controller
100: camera main body
102: mount
104: main monitor
104a: LCD driver
106: sub monitor
106a: LCD driver
108: electronic viewfinder (EVF)
108a: LCD driver
110: camera operator
111: sensitivity dial
112: delete button
113: power lever
114: shutter button
115: drive button
116: sub monitor illumination button
117: shutter speed dial
118: playback button
119: front command dial
120: rear command dial
121: focus lever
122: quick menu button
123: menu/OK button
124: selector button
125: display/BACK button
126: first function button
127: second function button
128: third function button
129: fourth function button
130: fifth function button
210: image sensor
210B: image sensor
210G: image sensor
210R: image sensor
212: imaging surface
214: AF area
216: normal pixel
218: phase difference detection pixel
218A: first phase difference detection pixel
218B: second phase difference detection pixel
220: image sensor movement driver 220x: image sensor movement driver
222: image sensor position detector
222x: image sensor position detector
224: image sensor driver
226: analog signal processor
228: analog-to-digital converter (ADC)
230: digital signal processor
232: phase difference AF processor
234: memory card interface
236: memory card
250: camera controller
250a: tracking controller
250b: focusing operation detector
250c: movable range switch
310: color separation prism
310a: incident surface
310b: B light exit surface
310g: G light exit surface
310r: R light exit surface
330: imaging unit
A: subject
E: end portion
L: optical axis
L1: movement locus of image formation point
L2: movement locus of image sensor
R0: reference position of image sensor
W: movable range of image sensor
W1: first movable range of image sensor
W2: second movable range of image sensor
S11 to S17: processing procedure of tracking control when tracking function is turned on
S21 to S26: processing procedure for switching control of movable range of image sensor
S31 to S37: processing procedure of tracking control

What is claimed is:

1. An imaging device comprising:
an imaging lens that has a focus adjustment function;
an image sensor;
an image sensor movement driver that moves the image sensor along an optical axis;
a focus detector that detects a defocus amount;
a tracking controller that controls the movement of the image sensor within a movable range to track a subject based on the defocus amount detected by the focus detector;
a focusing operation detector that detects a focusing operation of the imaging lens for the subject based on a change of the defocus amount detected by the focus detector; and
a movable range switch that widens the movable range of the image sensor in a case where the focusing operation is detected by the focusing operation detector.

2. The imaging device according to claim 1,
wherein, in a case where the tracking of the subject cannot be performed after the movable range of the image sensor is widened, the movable range switch narrows the movable range of the image sensor to an original range.

3. The imaging device according to claim 1,
wherein, in a case where a position of an image formation point of the subject is separated from the movable range of the image sensor by a predetermined distance or more after the movable range of the image sensor is widened, the movable range switch narrows the movable range of the image sensor to an original range.

4. The imaging device according to claim 1,
wherein, in a case where the focusing operation is detected by the focusing operation detector, the movable range switch widens the movable range of the image sensor to a predetermined range from zero.

5. The imaging device according to claim 1,
wherein the focusing operation detector detects the focusing operation by detecting that a fluctuation rate of the defocus amount is equal to or less than a threshold value within a predetermined range before and after a position at which the subject is focused.

6. The imaging device according to claim 1,
wherein, in a case where the subject is focused, the tracking controller starts the tracking of the subject.

7. The imaging device according to claim 1,
wherein, in a case where the defocus amount is continuously equal to or less than a threshold value for a predetermined time, the tracking controller starts the tracking of the subject.

8. The imaging device according to claim 1,
wherein, in a case where a fluctuation rate of the defocus amount is equal to or less than a threshold value within a predetermined range before and after a position at which the subject is focused, the tracking controller starts the tracking of the subject.

9. The imaging device according to claim 1,
wherein, in a case where the image sensor reaches an end portion of the movable range and the tracking of the subject cannot be performed, the tracking controller returns the image sensor to a reference position.

10. The imaging device according to claim 9,
wherein the tracking controller returns the image sensor to the reference position by moving the image sensor at a moving speed corresponding to the change of the defocus amount.

11. The imaging device according to claim 1, further comprising:
a mode switch that switches between turned-on and turned-off of a tracking range widening mode,
wherein, in a case where the tracking range widening mode is turned on and the movable range of the image sensor is widened once, the movable range switch stops a subsequent switching operation.

12. The imaging device according to claim 1, further comprising:
a mode switch that switches between turned-on and turned-off of a tracking range widening mode,
wherein, in a case where the tracking range widening mode is turned on and the movable range of the image sensor is widened once, the movable range switch stops a subsequent switching operation, and
in a case where the movable range of the image sensor is widened, the image sensor reaches an end portion of the movable range, and the tracking of the subject cannot be performed, the tracking controller causes the image sensor to stand by at the end portion of the movable range until the subject is focused again.

13. The imaging device according to claim 1,
wherein a reference position is set at a center of the movable range of the image sensor, and the reference position is set at a flange back position defined by the imaging lens.

14. The imaging device according to claim 1,
wherein the focus detector detects the defocus amount based on outputs of a plurality of phase difference detection pixels formed on an imaging surface of the image sensor.

15. The imaging device according to claim 1, further comprising:
- a monitor or an electronic viewfinder on which an image captured by the image sensor is displayed in real time,
- wherein the monitor and the electronic viewfinder has resolution lower than resolution of the image sensor.

16. An imaging device main body comprising:
- a mount to and from which an imaging lens having a focus adjustment function is attachable and detachable;
- an image sensor;
- an image sensor movement driver that moves the image sensor along an optical axis;
- a focus detector that detects a defocus amount;
- a tracking controller that controls the movement of the image sensor within a movable range to track a subject based on the defocus amount detected by the focus detector;
- a focusing operation detector that detects a focusing operation of the imaging lens for the subject based on a change of the defocus amount detected by the focus detector; and
- a movable range switch that widens the movable range of the image sensor in a case where the focusing operation is detected by the focusing operation detector.

17. The imaging device main body according to claim 16, wherein, in a case where the tracking of the subject cannot be performed after the movable range of the image sensor is widened, the movable range switch narrows the movable range of the image sensor to an original range.

18. The imaging device main body according to claim 16, wherein, in a case where a position of an image formation point of the subject is separated from the movable range of the image sensor by a predetermined distance or more after the movable range of the image sensor is widened, the movable range switch narrows the movable range of the image sensor to an original range.

19. The imaging device main body according to claim 16, wherein, in a case where the focusing operation is detected by the focusing operation detector, the movable range switch widens the movable range of the image sensor to a predetermined range from zero.

20. The imaging device main body according to claim 16, wherein the focusing operation detector detects the focusing operation by detecting that a fluctuation rate of the defocus amount is equal to or less than a threshold value within a predetermined range before and after a position at which the subject is focused.

21. A focusing control method of an imaging device that includes an imaging lens which has a focus adjustment function, an image sensor, an image sensor movement driver which moves the image sensor along an optical axis, a focus detector which detects a defocus amount, and a tracking controller that controls the movement of the image sensor within a movable range to track a subject based on the defocus amount detected by the focus detector, the method comprising:
- a step of detecting a focusing operation of the imaging lens for the subject based on a change of the defocus amount detected by the focus detector; and
- a step of widening the movable range of the image sensor in a case where the focusing operation is detected.

22. The focusing control method of an imaging device according to claim 21, further comprising:
- a step of narrowing the movable range of the image sensor to an original range in a case where the tracking of the subject cannot be performed after the movable range of the image sensor is widened.

23. The focusing control method of an imaging device according to claim 21, further comprising:
- a step of narrowing the movable range of the image sensor to an original range in a case where a position of an image formation point of the subject is separated from the movable range of the image sensor by a predetermined distance or more after the movable range of the image sensor is widened.

24. The focusing control method of an imaging device according to claim 21,
- wherein, in the step of widening the movable range of the image sensor, the movable range of the image sensor is widened to a predetermined range from zero in a case where the focusing operation is detected.

25. The focusing control method of an imaging device according to claim 21,
- wherein, in the step of detecting the focusing operation, the focusing operation is detected by detecting that a fluctuation rate of the defocus amount is equal to or less than a threshold value within a predetermined range before and after a position at which the subject is focused.

* * * * *